United States Patent [19]
Clemmons et al.

[11] Patent Number: 4,544,866
[45] Date of Patent: Oct. 1, 1985

[54] REMOTE WINDOW OPERATING SYSTEM
[75] Inventors: Richard R. Clemmons, Roscoe; Darrel E. Zimmer; Stephen H. Sanders, III, both of Rockford, all of Ill.
[73] Assignee: Amerock Corporation, Rockford, Ill.
[21] Appl. No.: 625,697
[22] Filed: Jun. 28, 1984
[51] Int. Cl.$^4$ .............................................. H02P 3/08
[52] U.S. Cl. ..................................... 318/54; 318/266; 318/331; 318/430; 318/469
[58] Field of Search ................ 318/54, 65, 71, 264, 318/266, 282, 286, 368, 430, 468, 469, 331

[56] References Cited
U.S. PATENT DOCUMENTS

| | | | |
|---|---|---|---|
| 2,994,525 | 8/1961 | Onksen et al. | 318/453 X |
| 3,781,622 | 12/1973 | Acton et al. | 318/466 |
| 3,792,332 | 2/1974 | Fuller | 318/102 X |
| 3,913,153 | 10/1975 | Adams et al. | 318/65 X |
| 4,119,899 | 10/1978 | Sumida | 318/469 X |
| 4,358,718 | 11/1982 | Delomez | 318/54 |
| 4,431,954 | 2/1984 | Carpenter et al. | 318/443 |
| 4,450,390 | 5/1984 | Andrei-Alexandra et al. | 318/282 |
| 4,471,275 | 9/1984 | Comeau | 318/469 X |

Primary Examiner—William M. Shoop, Jr.
Assistant Examiner—Bentsu Ro
Attorney, Agent, or Firm—Isaksen, Lathrop, Esch, Hart & Clark

[57] ABSTRACT

A window operating system includes a motor control circuit for controlling the operation of direct current permanent magnet motors mounted on window operators associated with each window. Each of the motors on each of the windows is connected to the control circuit only by a pair of wires which both power the motor and provide information to the control circuit as to the status of motor operation. The status of motor operation is determined by monitoring the back electromagnetic force expressed by the motors. To help differentiate back electromagnetic force from supply voltage supplied to the motors, the motors are supplied with full rectified alternating current power, rather than simple direct current, so that the presence or absence of zero voltage between half waves of the voltage expressed across the motors can be monitored to determine the absence or presence of back electromotive force during those time periods. A reversible connector is used to connect the motor to the control circuit so that the polarity of motor operation can be reversed by reversal of the connector relative to its mating receptacle.

7 Claims, 18 Drawing Figures

REMOTE WINDOW OPERATING SYSTEM

TECHNICAL FIELD

The present invention relates to motor control circuits in general and relates, in particular, to an electrical system for control of a motor operating a device such as a window, which is moved in one of two directions, i.e. opened or closed, depending on the direction of rotation of the motor.

BACKGROUND OF THE INVENTION

In many situations or applications where electric motors are used to do useful work, a direct current electric motor is utilized to move an object or objects in opposite directions depending on the polarity of the voltage applied to the motor. For example, if a motor operates a rotary device which in turn controls some mechanical structure, as for example a window operator which rotates to open and close a window, a direct current of one polarity will cause a motor connected to turn the window operator to rotate in one direction, and thereby open the window, while electric current of the opposite polarity will cause the motor to rotate in the opposite direction to close the window. Accordingly, systems for such an application need to have a mechanism to determine readily and conveniently which polarity of voltage is to be applied to the motor to cause the operation of the closure in the manner selected by the operator. A polarity fixed system for window operation in particular suffers from one inherent difficulty in that there is no standard for the mechanical operators of windows as to which direction a window operator should turn to open or close the window. Thus some windows are manufactured where a clockwise operation of the operator handle opens the window while some other windows are constructed such that a clockwise operation of the operator closes the window. Accordingly, a device for remote window operations must be adaptable to the particular windows to be utilized in the application. One way to achieve an adaptation for this problem in an electric remote window operating sytem is to have a switch or a jumper which can be installed into the system operating the motor controlling the window so that the polarity of operation of the window can be determined. Such a solution, however, suffers from deficiencies in that it is relatively expensive, and may require skilled installation, and may prove difficult to use if windows of opposite directional control are operated by a common control system.

The prior art is generally cognizant of the concept of operating motors with microprocessor or digital control, with control being responsive to the position of the motor control device. For example in U.S. Pat. No. 4,431,954, a microprocessor controls motor operation for windshield wipers with the position of the windshield wipers at any given time being determined by position sensors. Similarly U.S. Pat. No. 3,792,332, provides an interface for multiplex motor control systems in which a microprocessor or other control box is used to operate a number of motive devices. Other window or closure operating systems are illustrated in U.S. Pat. No. 3,781,622 and U.S. Pat. No. 2,994,525.

The broad concept of sensing the electromagnetic force from motor operation as a means of controlling motor operation is not new in and of itself. For example, the disclosures of U.S. Pat. No. 4,119,899 and U.S. Pat. No. 4,358,718, disclose motor operating devices for direct current motors which are, to some degree, responsive to the counter electromotive voltage induced in the direct current motors. Both of these systems operate with conventional direct current voltage supplies.

SUMMARY OF THE INVENTION

The present invention is summarized in that a remote window operating system includes a direct current motor connected to operate the window, the motor opening and closing the window depending on the polarity of the voltage applied to the motor; a rain sensor mounted on the outside of the window to electrically detect rain, the rain sensor connected to the motor by two conductors; a control circuit module for operating the motor by applying a voltage of a selected polarity to the motor depending on user input and on the output of the rain sensor; a cable of four conductors connecting the motor to the control circuit module, two conductors each for the motor and the rain sensor; a four conductor connector receptacle on the control circuit module; and a four conductor connector on the end of the cable to connect the cable to the control circuit module by mating with the connector receptacle, two of the conductors of the connector provided for each of the motor and the rain sensor, the arrangement of the conductors on the connector being reversably symmetrical such that the connector can be inserted in the receptacle in either of two reversed configurations with each reverse configuration corresponding to an opposite direction of rotation of the motor in relation to the polarity of the voltage applied to the motor by the control circuit module so that the polarity of window opening and closing operations can be appropriately selected by selection of the configuration of the connector as it is inserted into the connector receptacle.

It is an object of the present invention to provide for a system for remotely operating windows or other closures in which the direction of window operation can be selected by merely reversing the plug carrying power to the window operating motor without the need for further electrical or mechanical switching.

It is another object of the present invention to provide a window operating system which does not require skilled technical help to install.

It is yet another object of the present invention to provide a system for selecting the polarity of remotely controlled motor operation by appropriate selection of the polarity of insertion of a plug into a connector.

It is yet one more object of the present invention to further provide for a window operating system which also includes a rain detection device associated with the motor and connected through the cable to the motor wherein the rain sensor is also connected to the reversible plug associated with the control circuit module.

Other objects, advantages, and features of the present invention will become apparent from the following specification when taken in conjunction with the accompanying drawings.

DESCRIPTION OF THE PREFERRED EMBODIMENT

Figure 1:
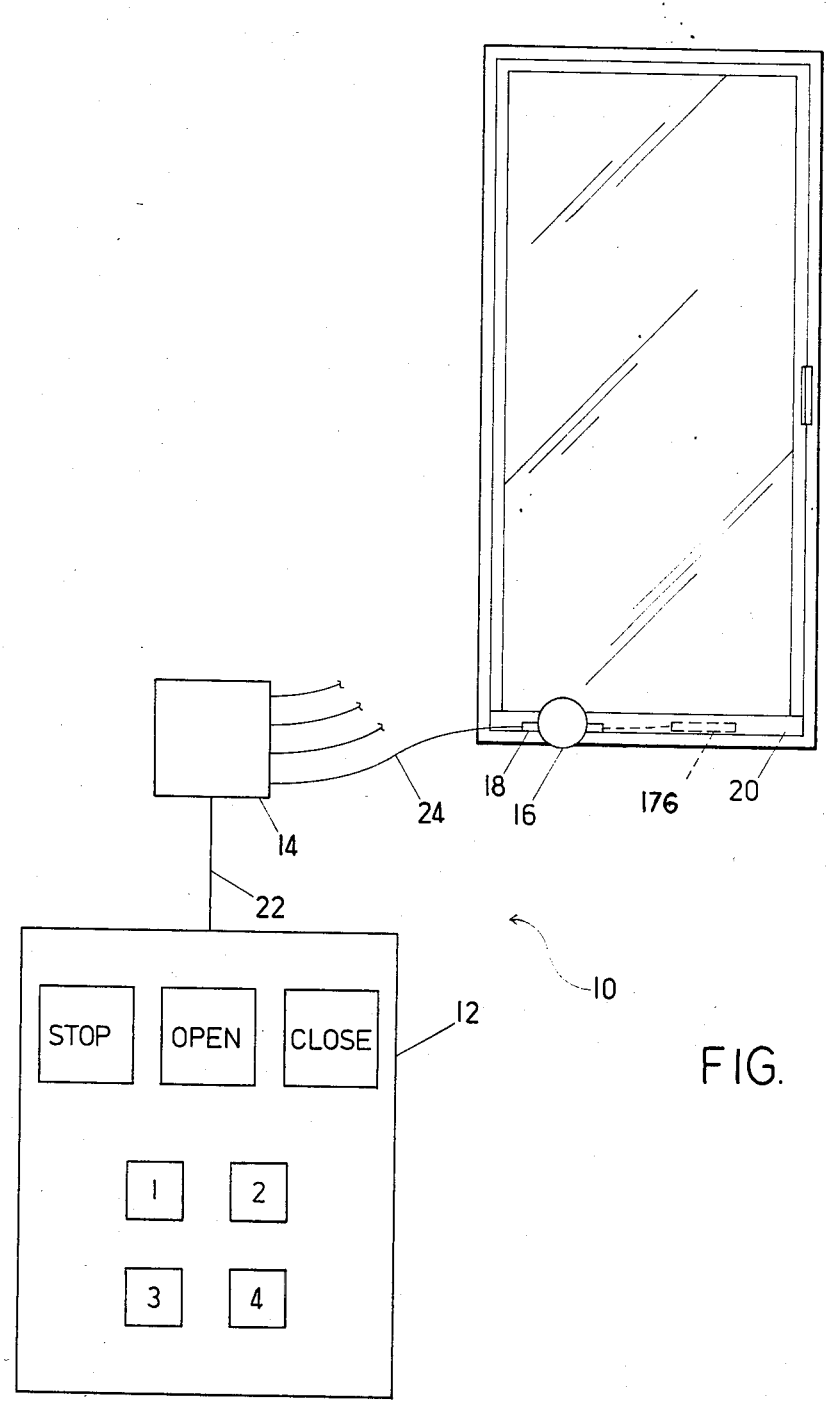
FIG. 1 is a front schematic view of a window operating system constructed in accordance with the present invention.

Shown in FIG. 1, and generally illustrated at 10, is a window operating and motor control system constructed in accordance with the present invention. The system in general includes three main components. The first component is a command module 12 by which the user may input commands to the system. The second major component is a control circuit module 14. A plurality of motors 16 are the third major component of the system with the motor 16 being used to do functional work. In the embodiment as illustrated in FIG. 1, the motor 16 is utilized to turn a window operator 18 which opens and closes a casement window 20. A suitable cable 22 of six conductors, as will be described in more detail below, is used to connect the command module 12 with the control circuit console 14. Motor cables 24 are provided to connect the control circuit module 14 to the various motors 16, each of the cables 24 being four conductor cables, as will also be discussed in more detail below.

Figure 2A:
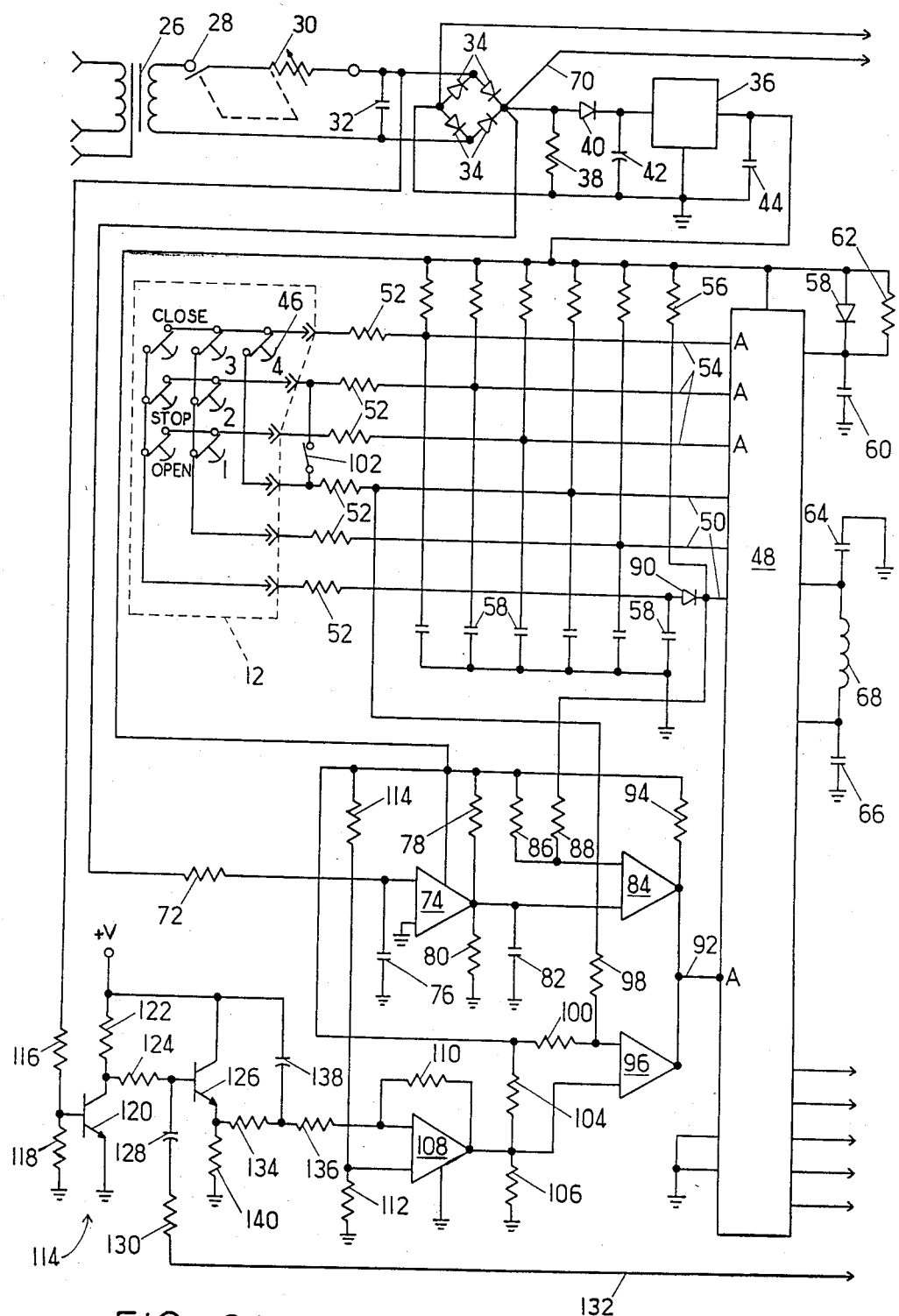
FIGS. 2A and 2B are two parts of a circuit schematic diagram of the control circuitry contained in the control circuit module of FIG. 1.
Figure 2B:
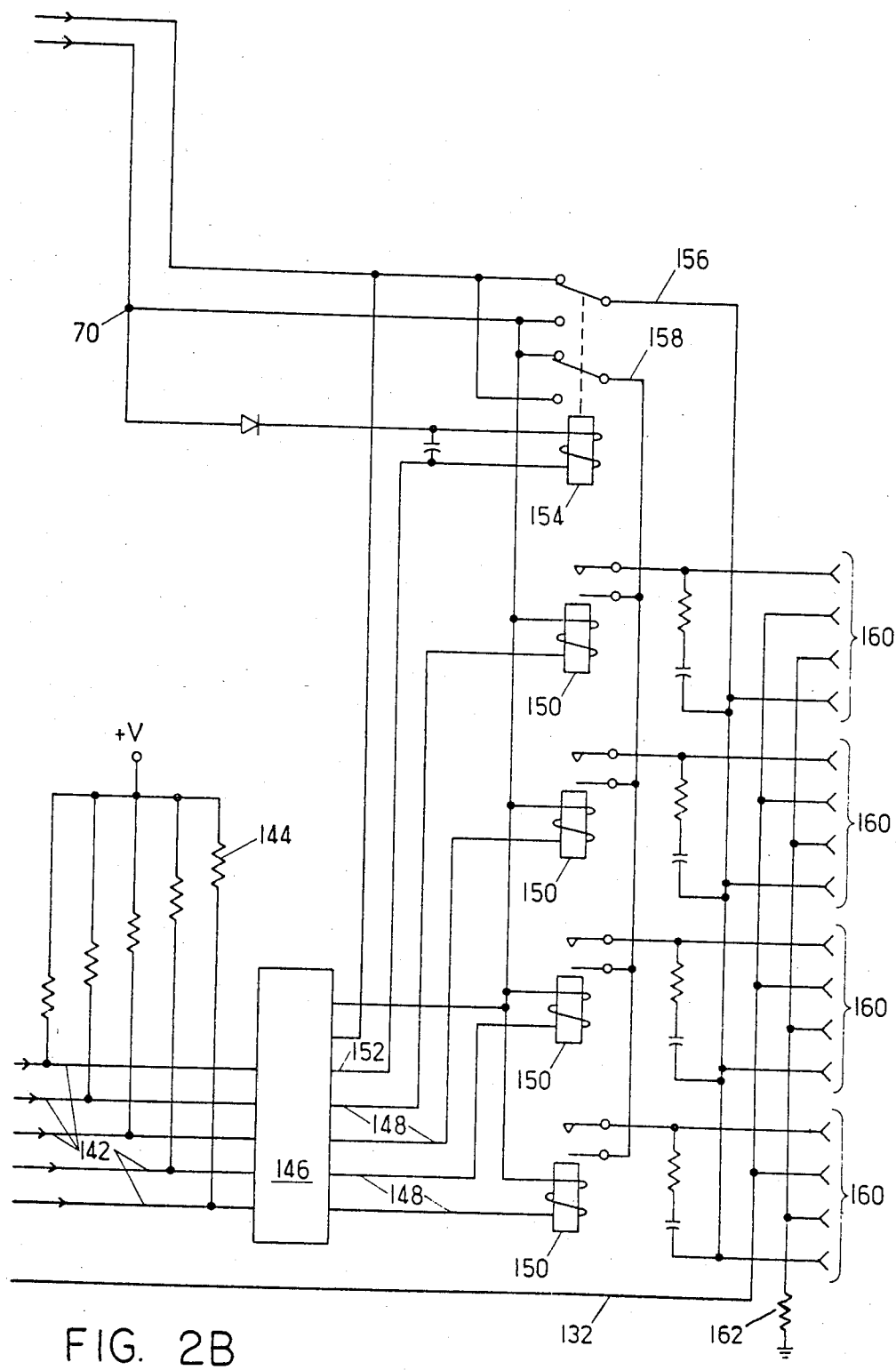

Shown in more detail in FIGS. 2a and 2b are the electronic circuitry of the command module 12 and the control circuit module 14. A power transformer 26 is provided connected through an off-on switch 28 to a small RC circuit consisting of a resistor 30 and a capacitor 32. A full wave rectifier in the form of a diode bridge consisting of four diodes 34 is connected to provide a full wave rectified voltage signal to a voltage regulator 36. The voltage regulator 36 is provided with a filtering circuit consisting of resistor 38, diode 40 and relatively large filtering capacitor 42 on its input and also with a transient filtering capacitor 44 on its output to provide regulated DC voltage, as for example at 5 volts, to the remaining circuit elements in the control circuit.

Illustrated within the dashed lines in FIG. 2a are the components contained within the command module 12. These components consist essentially of seven identical single pole normally open push buttons 46. The push buttons 46 have been labeled corresponding to the labels contained on the exterior of the command module as can be viewed in FIG. 1 The main processing component of the circuitry of FIG. 2a is a microprocessor chip 48 which includes within it both microprocessor logic and read only memory circuitry. Three single lines of an output one of two eight bit data buses of the microprocessor, designated 50, are connected through resistors 52 to scan the three columns into which the switches in the command module 46 are arranged. Each row of the switches 46 is connected through a respective resistor 52 to a respective line 54 of the second or input eight bit data bus of the microprocessor 48. A series of resistances 56 and capacitors 58 are used to suppress noise between the microprocessor 48 and the switches 46 which might arise in the six wire cable 22. A start-up reset circuit is provided consisting of a diode 58, a capacitor 60, and a resistor 62, connected to the reset input of the microprocessor 48 to clear the registers of the microprocessor upon power up of the system. An oscillator timing circuit consisting of two capacitors 64 and 66 and an inductor 68 are connected to the oscillator pins of the microprocessor to provide a time base to the microprocessor for use in clocking its functions and monitoring time delays. The selection of a particular microprocessor to use in the system is not important as long as the operation of the circuitry is in accordance with the method described herein and the flow chart described later, but the particular microprocessor preferred for this application is the PIC 1654.

The full wave rectified output of the bridge of diodes 34 is present at the circuit mode designated by the reference numeral 70. The node 70 is connected through a resistor 72 to the non-inverting input of a comparator 74. The inverting input of the comparator 74 is connected to ground. A capacitor 76 is also connected to the terminal of the comparator connected through the resistor 72 to the node 70. The output of the comparator 74 is connected to an RC network including resistances 78 and 80 and a capacitor 82, the output of which is connected to another comparator 84 at its negative input. The positive input to the comparator 84 is biased to the positive supply voltage by a resistor 86 and is then connected through a resistor 88 to one of the lines 50 of the first data bus of the microprocessor 48. A diode 90 is connected to that line of the data bus with its cathode directed toward the microprocessor and the comparator 84. The output of the comparator 84 is connected to a single line 92 which is a part of the input data bus into the microprocessor 48 including the lines 54, the input line 92 is also connected by a resistor 94 connected to the supply voltage and to the output of another comparator 96. The positive input to the comparator 96 is connected to the junction of a pair of resistors 98 and 100 with the resistor 100 connecting to the supply voltage and the resistor 98 connected to a one of the output data bus lines 50. That data bus line 50 is also selectably connected by a switch 102 to a selected one of the data bus input lines 54. The negative input to the comparator 96 is connected to the junction of a pair of resistors 104 and 106, one of which is connected to supply and the other of which is connected to ground. Also connected to the junction of the resistors 104 and 106 is the output of another operational amplifier 108. The operational amplifier 108 has a feed back resistor 110 connected between its positive input and output and has a voltage divider consisting of resistors 112 and 114 biasing its negative input. The positive input to the operational amplifier 108 is connected to a rain sensing circuit, generally indicated at 114. In the rain sensing circuit 114, a pair of resistors 116 and 118 divide the AC wave form expressed at one side of capacitor 32 and are connected to the base of a transistor 120. The collector of the transistor 120 is connected to resistors 122 and 124 which connect to the base of a transistor 126. The base of the transistor 126 is also connected through a series RC circuit consisting of a capacitor 128 and a resistor 130 to a rain detector signal line 132 which is connected to rain sensor, as will be described in further detail below. The collector of the transistor 126 is connected to supply while the emitter is connected through resistors 134 and 136 to the non-inverting input of the operational amplifier 108. A capacitor 138 and a resistor 140 complete the RC timing circuit connected across the output of the transistor 126 to modify its output.

As illustrated in FIG. 2b, five single lines of the output data bus of the microprocessor 48, the lines being indicated at 142, are each biased by resistors 144 connected to the supply and are all connected to a relay driver 146. The relay driver 146, beside its connection to supply and ground, has as its output five relay driving signal lines. Four of those lines, indicated at 148, are each connected respectively to one terminal of the coil of each of a set of four motor switching relays 150. The other side of the coil of each of the relays 150 is connected directly to the node 70. The remaining output driver line of the relay driver 146, indicated at 152, is connected to one terminal of a coil of a double pole relay 154. The other terminal of the coil of the relay 154 is connected through a diode to the node 70. The double pole relay 154 is also a double throw relay. In one of its two positions it connects the ground to a motor driving line 156 and in its other throw it connects the ground to a motor driving line 158. Similarly and complimentarily, the relay connects the node 70 to the motor driving line 158 in one of its positions and to the motor driving line 156 in its other. The motor driving line 158 is connected to one of the terminals of the single pole normally open switches in each of the relays 150. The outputs of the circuitry of FIG. 2b are grouped in four output groups designated by the similar reference numerals 160. The first line in each of the output groups 160 is the motor driving line 158 switched through the respective relay 150 associated with each of the output signal groups 160. The second signal in each of the output signal groups 160 is the motor driving line 156. RC circuits are connected between each of the motor driving lines 156 and 158 associated with each of the output signal groups 160 to reduce noise thereon. The third signal in each output signal group 160 is the rain detector signal line 132. The remaining signal line in each of the output signal groups 160 is connected to ground by a resistor 162. Each of the output signal groups 160 forms the four conductors in a single one of the cables 24 connecting the control circuit module 14 to the motor 16 operating each of the particular windows.

Figure 11:
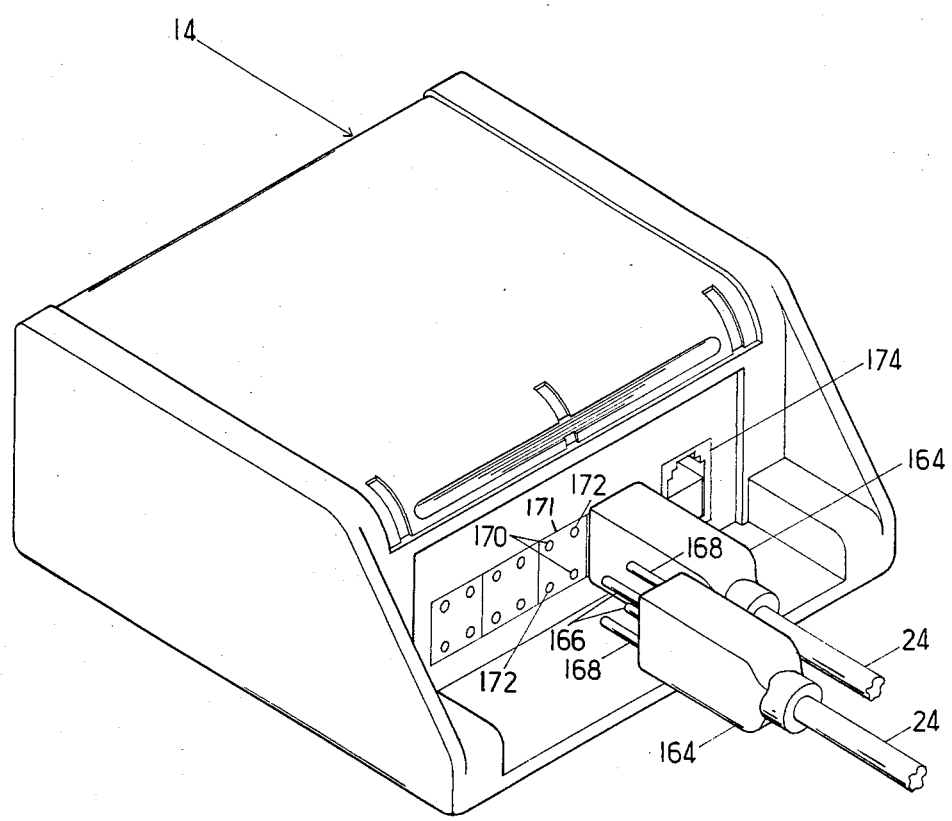
FIG. 11 illustrates a prospective view of a command circuit module and a removable connector associated therewith in accordance with the present invention.

Shown in FIG. 11 is a perspective view of a command circuit module at 14 packaged in a casing. Shown extending to the right in FIG. 11 are the terminal ends of a pair of the four conductor cables 24 which connect the control circuit module 14 with respective window motors 16. As can be seen in FIG. 11, each of the cables 24 terminates in a four conductor connector 164 which has four conductors protruding longitudinally from its end. The four conductors of the connector 164 are arranged in diagonally associated pairs 166 and 168. The arrangement of the conductors on the connector is doubly bilaterally symmetric in that it is symmetric both on a vertical and horizontal axis so that there is a reversible symmetry to the conductors 166 and 168 as will be discussed further below. Provided on the back of the casing for the control circuit module 14 is a connector receptacle 171 which also contains four conductors which again are in associates diagonally related pairs 170 and 172. The arrangement of the conductors 170 and 172 in the connector receptacle 171 is also doubly bilaterally symmetrical and corresponds to the arrangement of the conductors 166 and 168 on the connector 164. A jack is also provided at 174 on the back of the control circuit module 14 for connection to the command module 12.

To connect the control circuit module onto an appropriate one of the windows, the appropriate four conductor connector 164 is inserted in the appropriate connector receptacle 171 for the designated window to be operated. Each of the two pairs of conductors 170 and 172 on the connector receptacle 171 are internally connected to one conductor each of the output signal group 160 associated with that appropriate window. Two of the conductors, i.e., the conductors 170 are selected for operation of the appropriate motor 16 and are connected to the motor driving lines 156 and 158 in FIG. 2B. The remaining two conductors, i.e., two conductors 172, are associated with a rain detector 176 illustrated in FIG. 1. The rain detector 176, located outside of the window 20, is connected by a two wire cable to the motor 16 for convenience so that its signal can be carried by the cable 24 back to the control circuit module 14. Thus two of the conductors in each group are associated with the motor 16 and two of the signals in each four wire group are associated with the rain detector 176. The motors 16 are preferably DC permanent magnet motors adopted for operation at high torque and low RPM were geared to provide that output.

In the operation of the circuitry of FIGS. 2a and 2b, the circuitry is intended to provide power to the motors 16 and to sense the nature of the response to that power, to operate the windows 20. The microprocessor 48 in accordance with its internal programming scans the command module 12 to determine commands from the user to close or open particular windows and also is informed by the user the number of the particular window or windows to be opened or closed. The microprocessor obtains this information by selecting and outputting signals on its output data bus lines 50 and by reading the results by reading data from the input data bus lines 54. The logic of motor operation is then determined and a digital byte formulated to energize the appriorate motor and that information is then outputted by suitable signals provided on the output data bus lines 142 to the relay driver 146. By providing the appropriate output data byte, the relay 154 is driven into the appropriate one of its two positions to provide power of one or the other polarity to the motor driving lines 156 and 158 connected through the output signal groups 160 to the motor 16 to be operated. The particular motor to be operated in any given time is selected by actuation of one of the four single pole relays 150. The selection of the particular relay 150, and thereby the motor to be operated, is done by the selection of a proper data output on the output data bus lines 142.

The full wave rectifier of the diodes 34 functions as a wave shaping means for shaping the power waveform to be supplied to the motors 16. As will become apparent from the discussion below, it is important that this power waveform be a periodic waveform which reaches zero volts. While full rectified alternating current is preferred, it is also possible to use other periodic waveforms such as half wave rectified AC or square signals.

The comparators providing input to the input data line 92 provide additional sensing information to the microprocessor. As will be discussed in more detail below, the comparator 74 functions to examine the reverse EMF expressed on the motor 16 to detect motor stall conditions. The comparator 96 joins a signal received from the rain detecting circuit 114, designed to sense rain so that windows can be closed, with information received from the switch 102 which indicates the use of a casement window. The function of these components will be understood in more detail after description of the flow charts describing the method of operation of the microprocessor 48 of FIG. 2A.

Referring now to FIGS. 3 through 10, the flow chart of operation of the program driving the microprocessor 48 is summarized. Beginning in FIGS. 3A and 3B, the main program routine begins with a start indicated at step 200 and then proceeds to clear the rain flag bit at step 202. All output ports are then initialized to insure that all relays are off at step 204. The random access memory of the microprocessor is also cleared in step 204. The initialization of ports is done by outputting a data signal which has a zero component in each of the output data bus lines 142. The program then proceeds to call the scan keyboard subroutine indicated at 206 for relevant data entry. The scan keyboard routine is illustrated in greater detail in FIGS. 6A through 6C and will be described in greater detail below. In program step 208 the rain detector is enabled by outputting a suitable data bit on the output data bus 50 line connected to the comparator 96. A delay subroutine indicated at 210 is then called to allow operation of the rain sensor. Following the delay at 210, a branch decision is made in the program at 212 depending on whether or not rain detection occurs. If rain detection does occur then a branch is made to program step 214 where a branch decision is made determining whether or not the rain flag has been previously set. If the rain flag has been previously set then the program proceeds to step 216 clearing the accumulator and then returns through loop C to a higher point in the program as illustrated in FIG. 3A. If the rain flag is not set, then the program branches to program step 218 illustrated in FIG. 3B and then sets the rain flag bit internally in the memory of the microprocessor. The program then proceeds to clear, internally in its own memory, its register indicating the open button has been pressed at step 220, and then proceeds to step 222 to artifically set in its memory a condition that all closed buttons have been set. Then the program proceeds to set all the keyboard bits to indicate operation of all windows at step 224 as if the buttons for closing all windows had been pressed. Following that, before operation of the windows proceeds, an enabling step is made at 226 to enable a branch test condition at 228 to determine the window type. This test enable is made by enabling the appropriate output data bus line 54 and monitoring the appropriate input data bus line 50 to see if switch 102, indicating the presence of a casement window, is closed. If the window type is casement, the program proceeds to casement operating subroutine 230 before returning to loop in the program as indicated at A in FIG. 3A. If the program assumes an awning type window since it is not a casement then the program proceeds to awning subroutine operation 232 before returning to the same point A to loop into the program. Both of the subroutines for casement and awning window operation will be described in further detail below. If rain detection was not made at the branch condition 212 in FIG. 3A, the program then proceeds to clear the rain flag bit at step 234. Whether the rain flag bit has just been cleared or if the rain flag bit had been previously set but did not require action at this time, the program loops as indicated at C to the test to determine if any control buttons have been pressed at step 236. If no control buttons have been pressed, as determined by flags set during the keyboard scan subroutine, the program loops back to scan the keyboard at subroutine 206. If control buttons are pressed the program continues to another conditional branch operation at 238 to determine if the stop button has been pressed. If the stop button has been pressed the program loops back to point B so as to initialize ports and stop all motor operation in accordance with the stop instruction. If the stop number has not been pressed then the program proceeds to conditional branch 240 to determine if any numbers have been pressed. If no numbers have been pressed the program proceeds to step 242 and assumes that all windows are to be operated and therefore internally forces all numbered keyboard bits in memory to a state indicating operation of all windows. The program then reaches the conditional branch 244 either with a single window being selected at conditional branch 240 or with all of the windows having been selected through the step 242. At conditional branch 244 the program determines whether it has been instructed to open a window by scanning the flag for open window set by the keyboard scan subroutine. If it receives a yes from its scan, it then clears the direction bit outputted to the relay 154 at step 246 to indicate the direction at which window operation is to be made, i.e. in the direction of opening the windows. If no open instruction is received, the program assumes that the windows are to be closed, and proceeds to step 248 to set the direction bit in the opposite polarity to indicate closure of the windows by forcing the opposite polarity of the relay 154. In either event, the program then proceeds to branch point D1 to test for style of windows and then to operate in the appropriate subroutine either a casement or an awning window.

Figure 4:
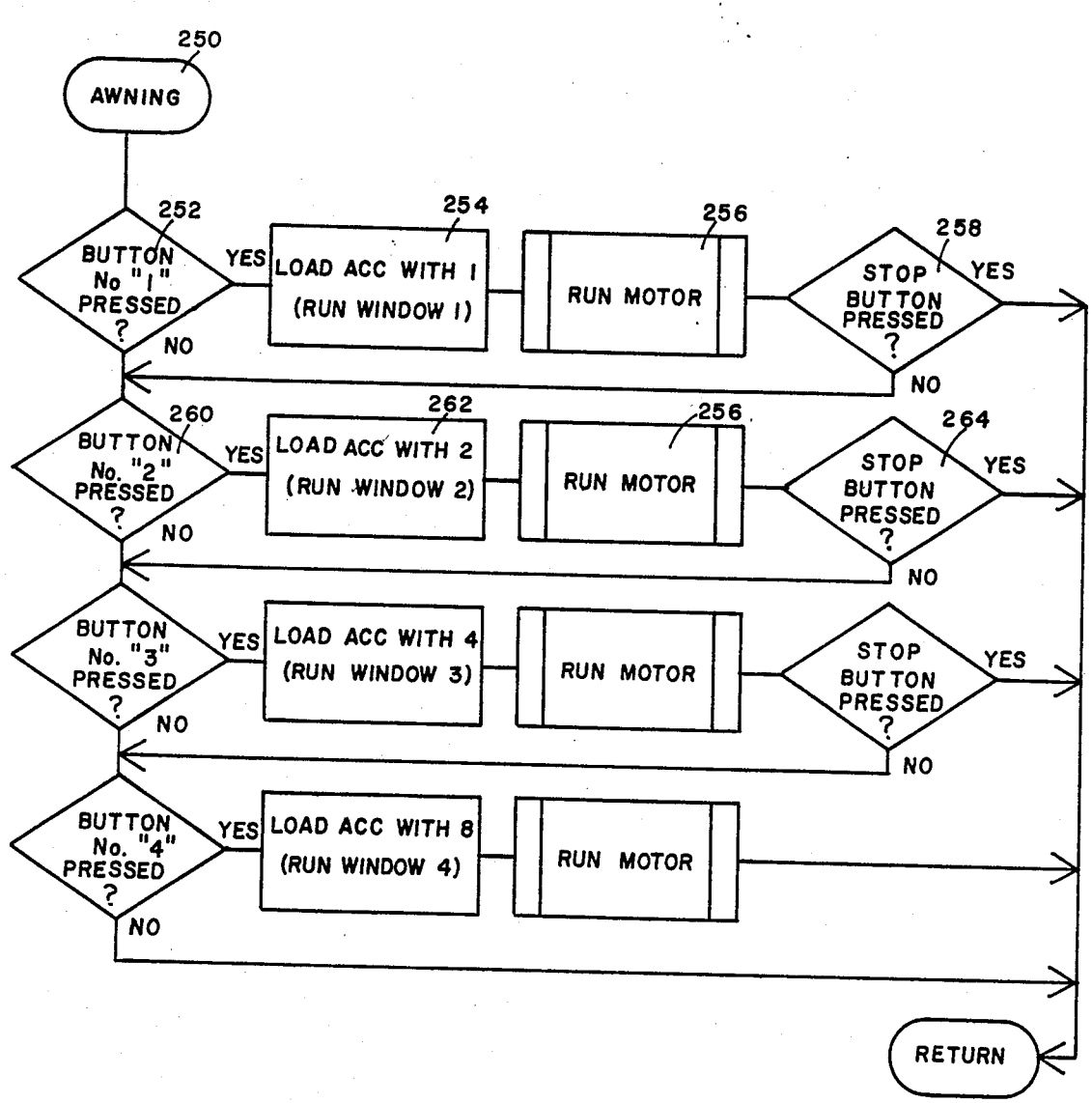
FIG. 4 is a flow chart of a subroutine called by the program of FIG. 3.

The operating routine for each of the type windows will now be described in detail. Referring to FIG. 4 first, the subroutine for operation of an awning type window is described. Beginning with commencing step number 250, the program then commences to a conditional branch to determine if button number 1 has been previously depressed. At this point the program is not scanning the keyboard but is scanning its internal memory set in response to keyboard scan to determine whether the appropriate button was pressed when the keyboard was scanned. If button 1 has been pressed, then the accumulator is loaded with number 1 indicating that window number 1 is to be operated, at step 254, and then subroutine 256 for operation of the motor is called. After return from the subroutine 256 a conditional branch is made at 258 to determine if the stop button is pressed. If the stop button has been pressed, then the program immediately branches to return 261 to return from the subroutine and if the stop button has not been pressed then the program branches to conditional branch 260. Conditional branch 260 tests if button number 2 has been depressed and, if it has, the program then loads the accumulator with button number 2 information at step 262, by loading a binary 2 in the accumulator, and again runs subroutine 256 operating the motor. Again a conditional branch is made at 264 to determine if the stop button is pressed and then immediately returned from the subroutine or branch to button 3. The operation of testing to operate windows 3 and 4 is similar except that a binary 4 or 8 repectively is loaded in the accumulator to operate window 3 or 4.

Figure 3A:
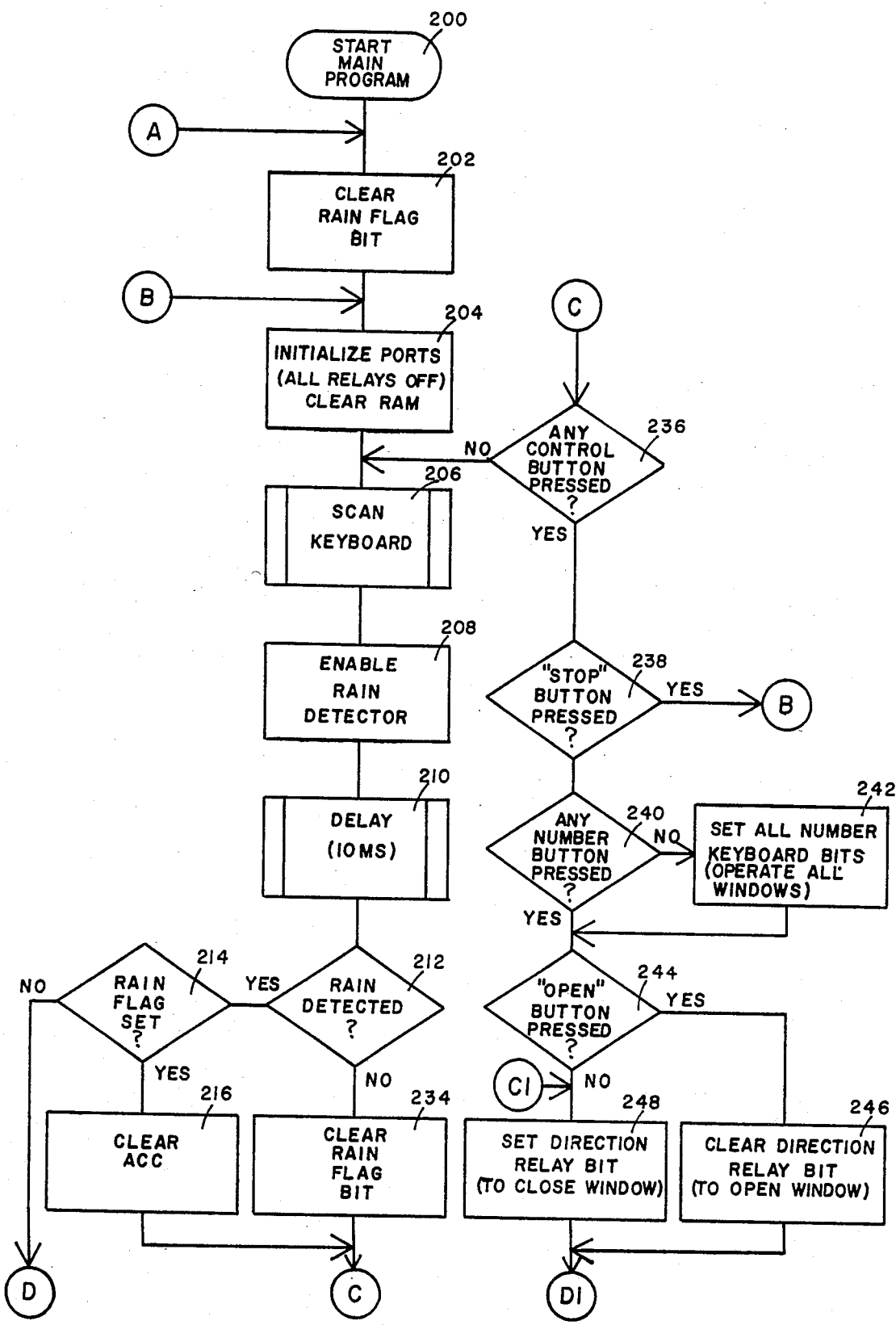
FIGS. 3A and 3B together illustrate a flow chart for the basic method of operation for the program for the microprocessor of the control circuit of FIG. 2.
Figure 3B:
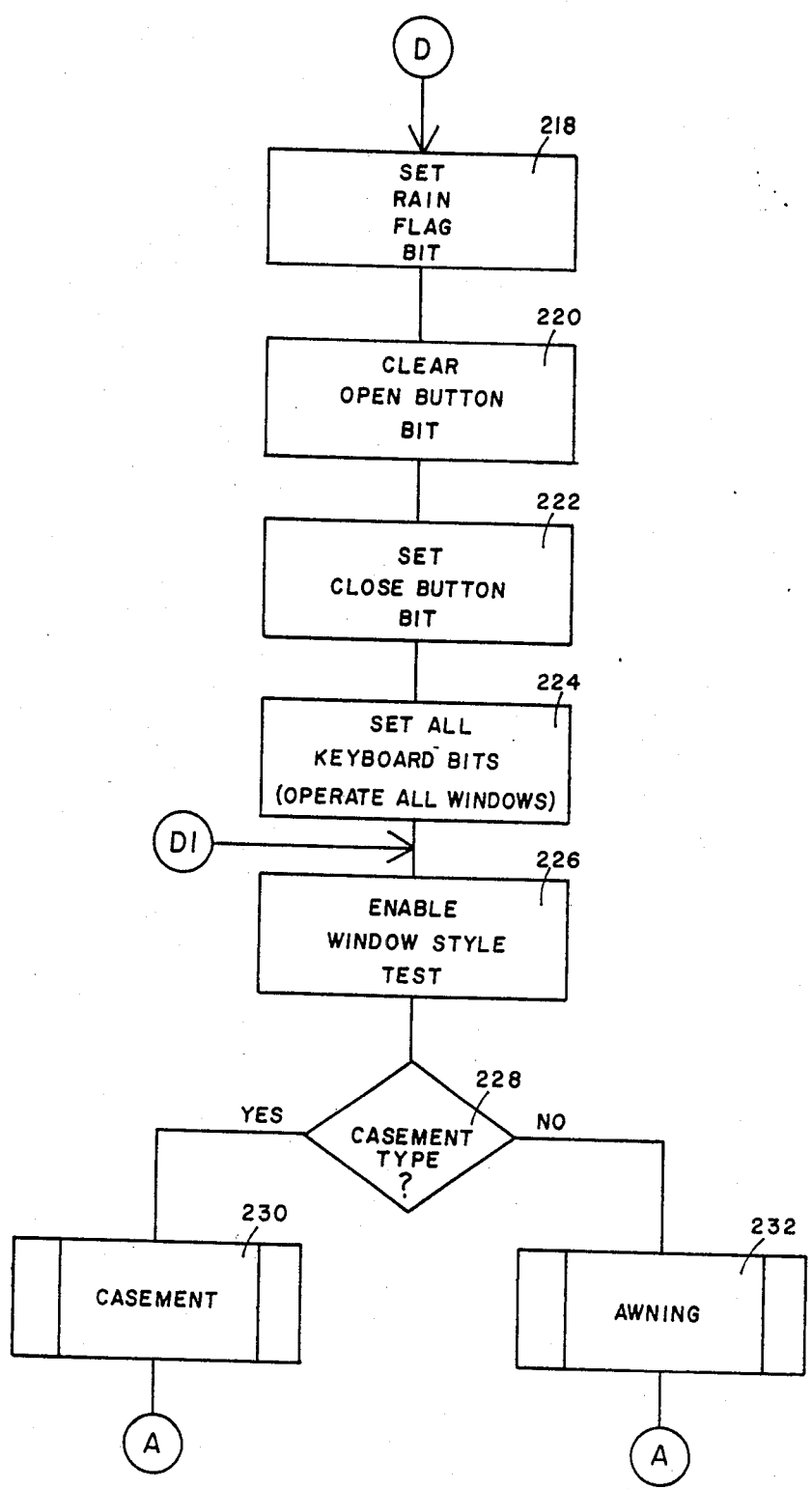
Figure 5A:
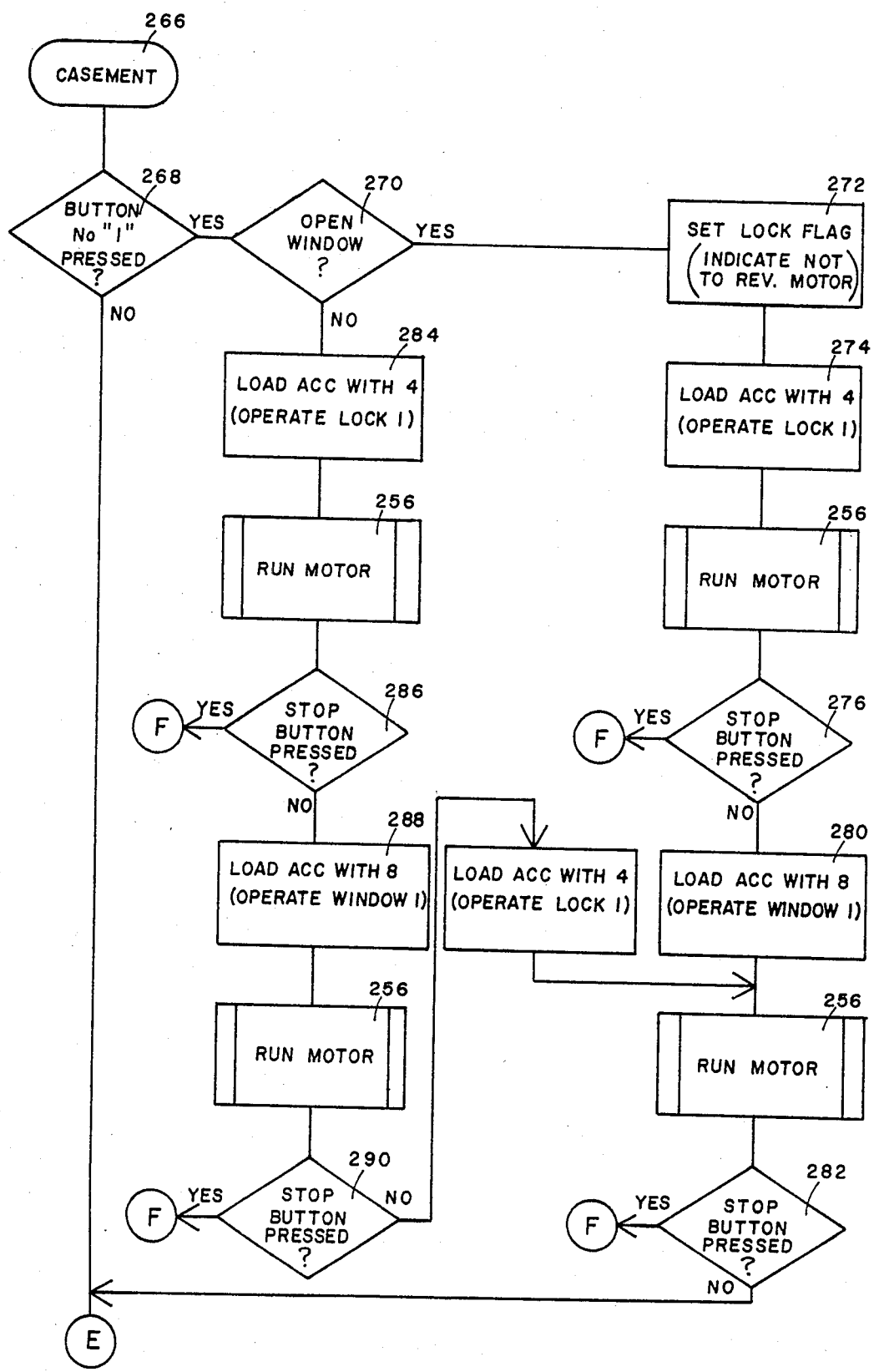
FIGS. 5A and 5B together are a flow chart which illustrates another subroutine called by the program of FIGS. 3A and 3B.
Figure 5B:
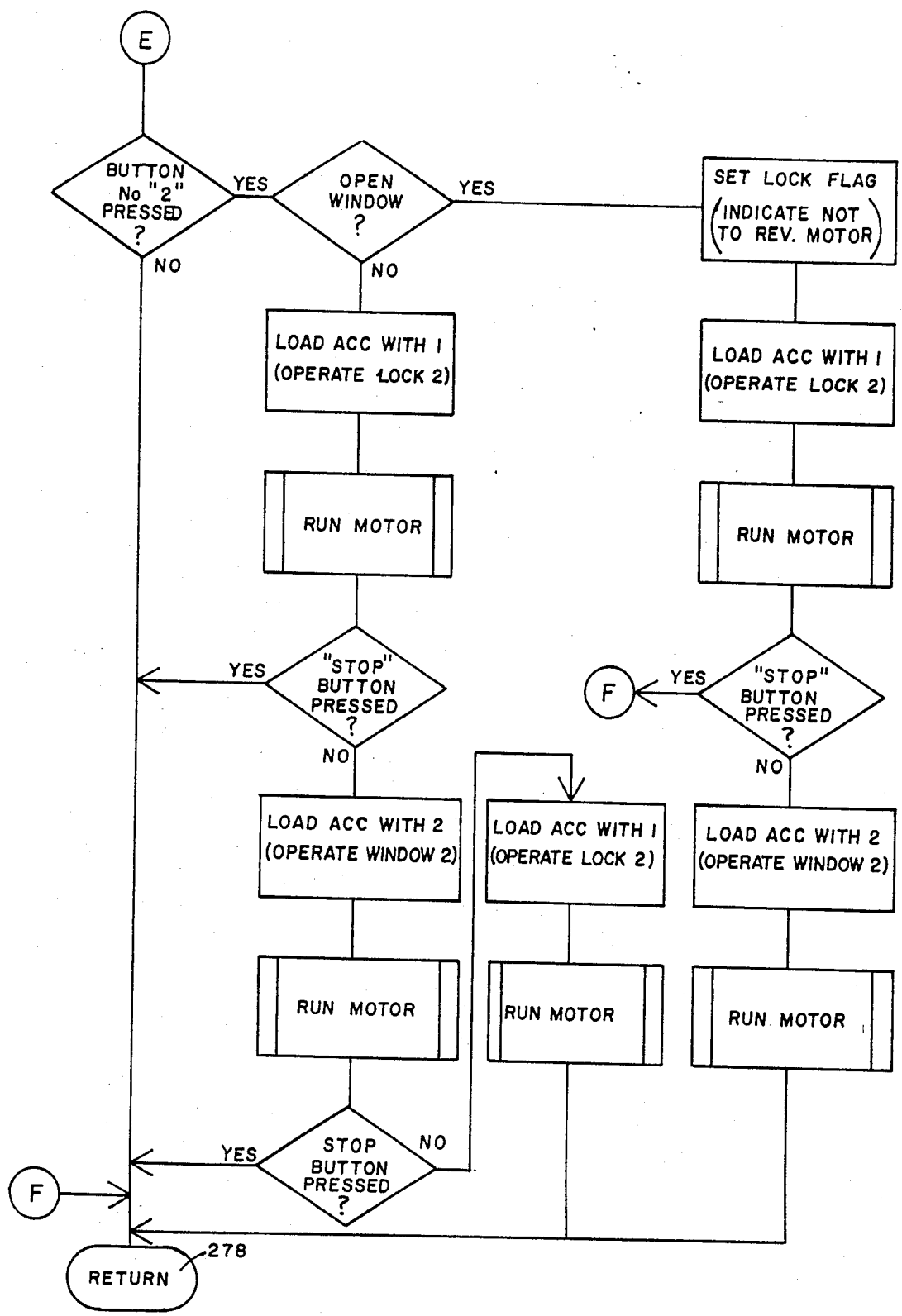

Illustrated in FIG. 5A is a flow chart for the casement subroutine 230 which is called in the window operation routine illustrated in FIG. 3B. The casement operating subroutine commences with step number 266 and then proceeds to conditional branch 268 to determine if the button for window number 1 has been pressed. If the button for window number 1 has been pressed, the program branches to program step 270 which is a conditional branch to determine if the window is to be opened or not. If the window is to be opened, then the program branches to step number 272 which sets a lock flag to indicate that the window being operated is a casement window by setting a lock flag to indicate that the motor is not to be reversed after the lock is engaged. The program then proceeds to step number 274 in which the accumulator is loaded with a binary 4, which places on the output of the output data bus 142 a logical one only at the appropriate location for operating the lock for window number 1. Then the program proceeds to call the run motor subroutine 256. After return from the subroutine the program proceeds to conditional branch step number 276 at which time it determines whether or not the stop button is currently pressed. If the stop button is currently pressed, the program immediately branches to the return command 278 indicated in FIG. 5B. If at conditional branch number 276 the stop button is not pressed, the program proceeds to step number 280 in which the accumulator is loaded with a binary 8 which indicates a one on the output line in data bus 142 which will operate only the motor associated with the window number 1. Then the program proceeds to the run motor subroutine 256 and after it returns from that operation it again checks to see if the stop button has been pressed at step 282. Again, if the stop button is pressed the branch is made directly to return step 278, while if the stop button has not been pressed the program then proceeds to test for operation of window number 2, as illustrated in FIG. 5B. At conditional branch 270, if the window was to be closed and not opened, the program branches to program step 284 which loads the accumulator with a binary 4 to first operate the window lock for window 1. The theory is that the window lock should be first opened before the window is closed so that an attempt is not made to close the window onto a closed lock. With a binary 4 in the accumulator, indicating operation of the lock, the run motor subroutine 256 is run to thereby operate the lock. Again a conditional branch is made at step number 286 to determine if the stop button has been pressed, and if it has the subroutine terminates. If the stop button has not been pressed, program step 288 loads the accumulator with a binary 8 to operate window 1 and the run motor subroutine 256 is called. Again after returning from the subroutine program step 290 checks to see if the stop button has been pressed and if an immediate return should be executed. If not, the accumulator is loaded with a binary 4 now to lock the lock associated with window 1 and again the run motor subroutine 256 is called. The complete flow chart as indicated in 5A, except for the begin step 266, is solely concerned with the operation of one casement window and its associated window lock. The portion of the casement window subroutine illustrated in 5B, except for the return step 278, is associated with the operation of the second window and its associated lock. The system described here is thus capable of operating only two casement windows and their two associated locks or four awning windows, which normally have no locks, although, of course, other embodiments of this system with a greater multiple number of windows or locks could be constructed using similar logic. In the procedure of FIGS. 5A and 5B, the respective locks associated with each window are treated, for motor running purposes, like a window themselves in the sense of the subroutines. Thus the locks must also be operated by permanent magnet DC motors. If no casement window locks are to be automatically operated, four casement windows could be operated using the awning window subroutine.

Figure 6A:
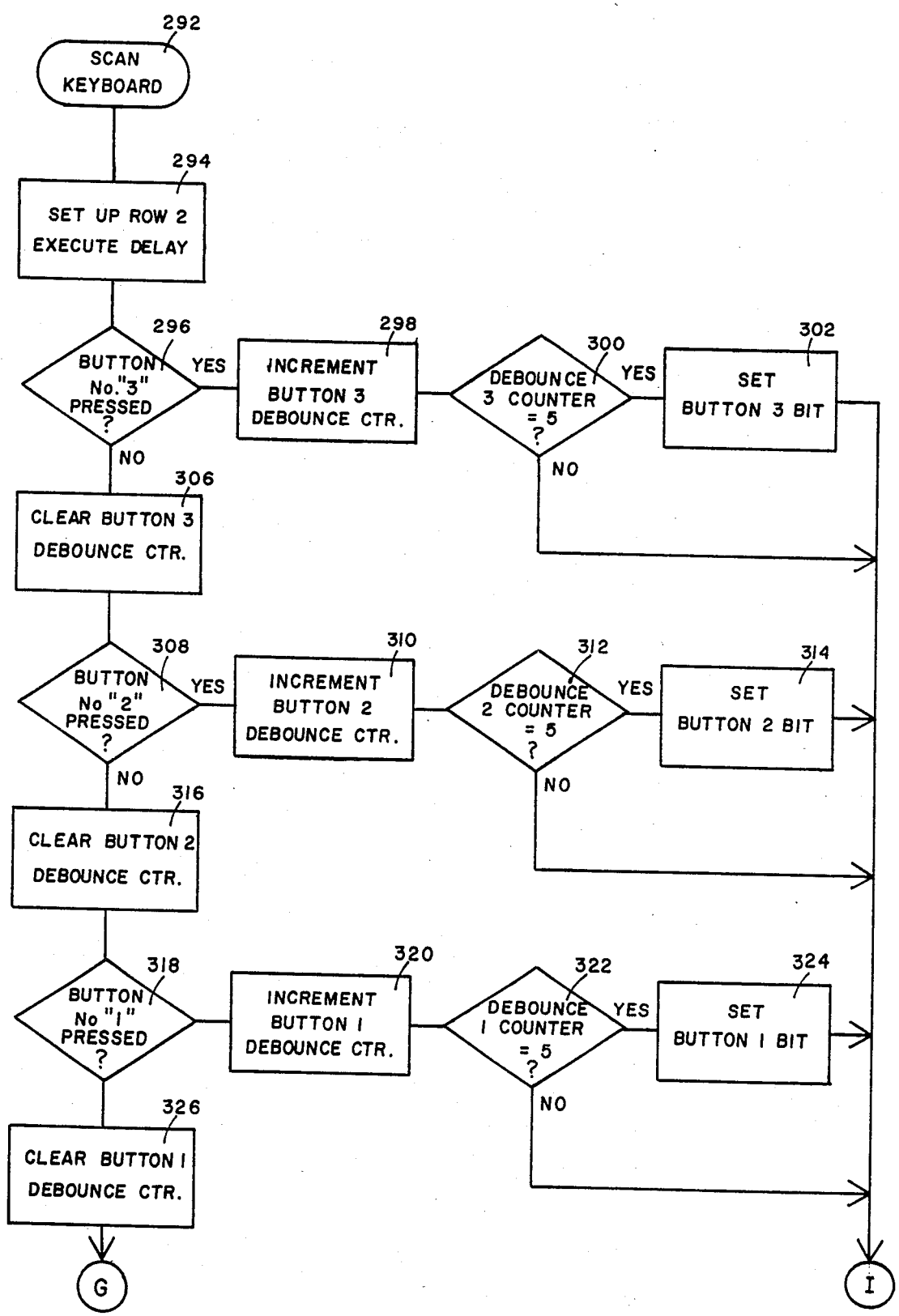
FIGS. 6A, 6B and 6C together illustrate by flow chart another subroutine called by the program of FIGS. 3A and 3B.
Figure 6B:
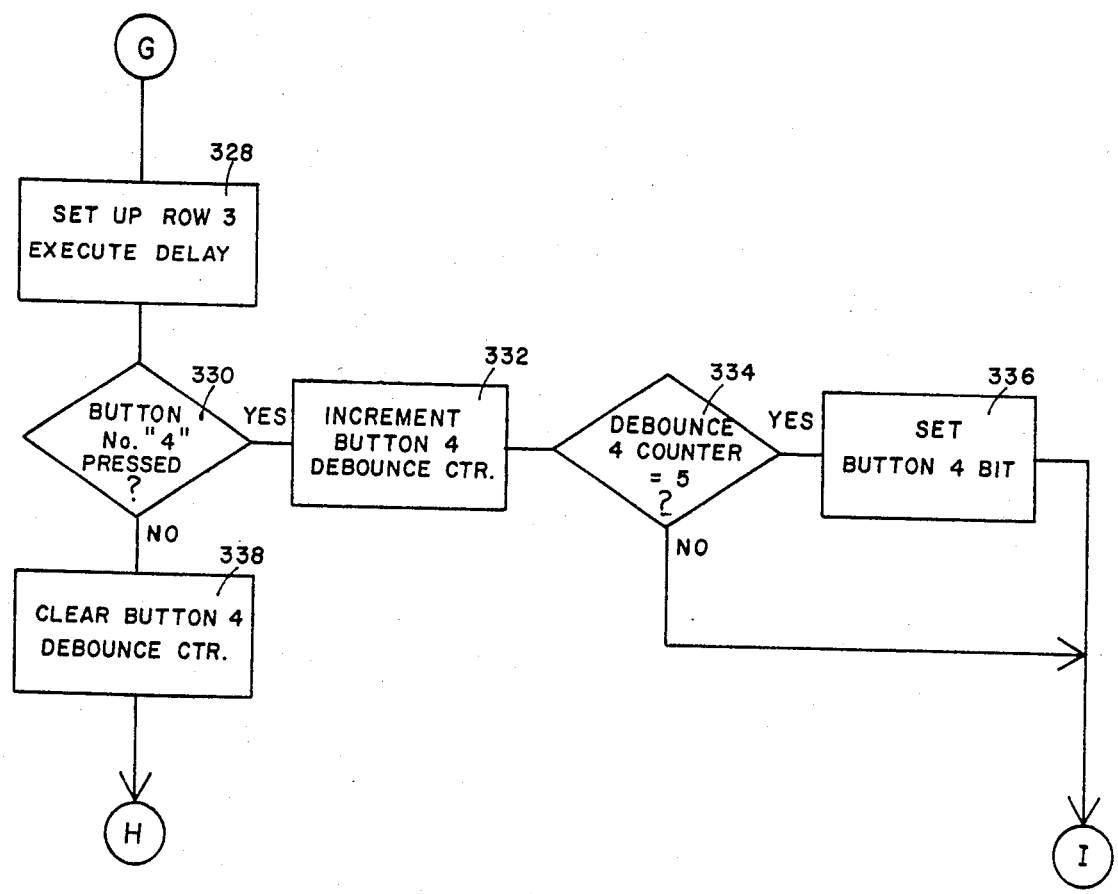
Figure 6C:
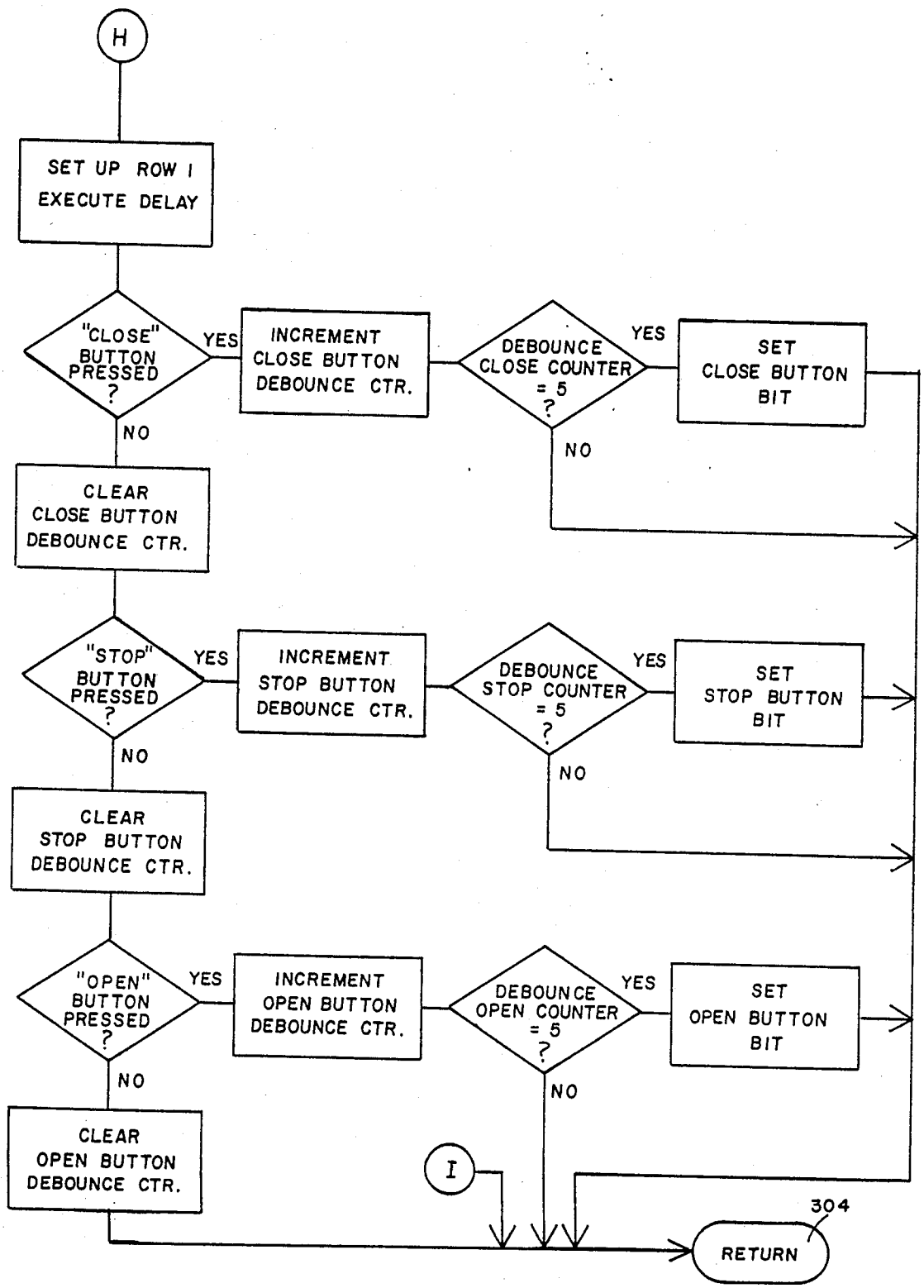

Shown in FIG. 6A is the scan keyboard subroutine 206 which is called in the main program as illustrated in FIG. 3A. The scan keyboard step begins at 292 and then proceeds to program step 294 which both scans the second row of the switch display by energizing the appropriate output data bus line 50 and also delays to allow for transients in the cable. Then a conditional branch is executed at step 296 depending on whether or not button number 3 is pressed. Tne test for button number 3 is made by sensing the input on the appropriate input data bus line 54 associated with the button number 3. If button number 3 is pressed, then the program branches to step number 298 where the debounce counter associated with button number 3 is incremented by 1. The program then proceeds to a conditional branch at step 300 where it tests whether or not the debounce counter for button number 3 has yet reached a value equal to 5. If that value has been reached then the program sets its internal flag indicating that the button for number 3 has been pressed at step number 302. Whether or not the bit for button number 3 has been set, the program then branches to the return at 304 in FIG. 6C. If, at conditional branch 296, the button number 3 is not depressed, the program then proceeds to step 306 in which the debounce counter for button number 3 is cleared. Thus the routine must be called and positively detect the depression of button 3 five times in a row before the program assumes the button was actually depressed. The program then proceeds on to test for the depression of button number 2 at conditional branch 308, button number 2 being the next button in the column also containing button number 3. If button number 2 is depressed, the button number 2 debounce counter is incremented at step 310 and at step 312 a conditional branch is made to determine whether or not the button number 2 debounce counter has yet reached 5. If the debounce counter for button number 2 has reached 5, in step 314 the button number 2 bit flag is set and whether or not the button number 2 bit is set, the program then returns through step 304. Similarly, if at conditional branch 308 it is determined that the button number 2 is not pressed, the program proceeds to step 316 where the button number 2 debounce counter is cleared and then proceeds to step 318 which is a conditional branch to determine whether button number 1 is depressed. Again, if button number 1 is depressed, the program proceeds to step 320 where the button number 1 debounce counter is incremented by 1 and then to step 322 which is a conditional branch to determine if the debounce for button number 1 counter has yet reached 5. If the count has reached 5, at step 324 the set button number 1 bit is set and whether or not that bit is set, the program returns at step 304. Again if button number 1 is not depressed, the program proceeds to step 326 in which the button number 1 debounce counter is cleared. It can be readily seen by reference to FIG. 6A as a whole that this program sequentially scans each of the buttons in each row of the column containing buttons 3, 2 and 1. The program then proceeds to the program steps illustrated in FIG. 6B in which row 3, as opposed to row 2, is energized and proceeds to perform a similar scan to determine if button number 4 is depressed. Similarly, in FIG. 6C a scan of all three of the buttons contained in row 1 is performed in a fashion similar to the scan of each of the buttons labelled 1 through 3 as illustrated in FIG. 6A. Within the subroutine illustrated in FIGS. 6A, 6B and 6C, the subroutine has to be executed five sequential times with the same button being depressed before the bit flag associated with that button is set by the subroutine. These five sequential operations of the subroutine are required to obtain a valid command in order to minimize or eliminate transient noise spikes and keys which are not properly depressed.

Figure 7A:
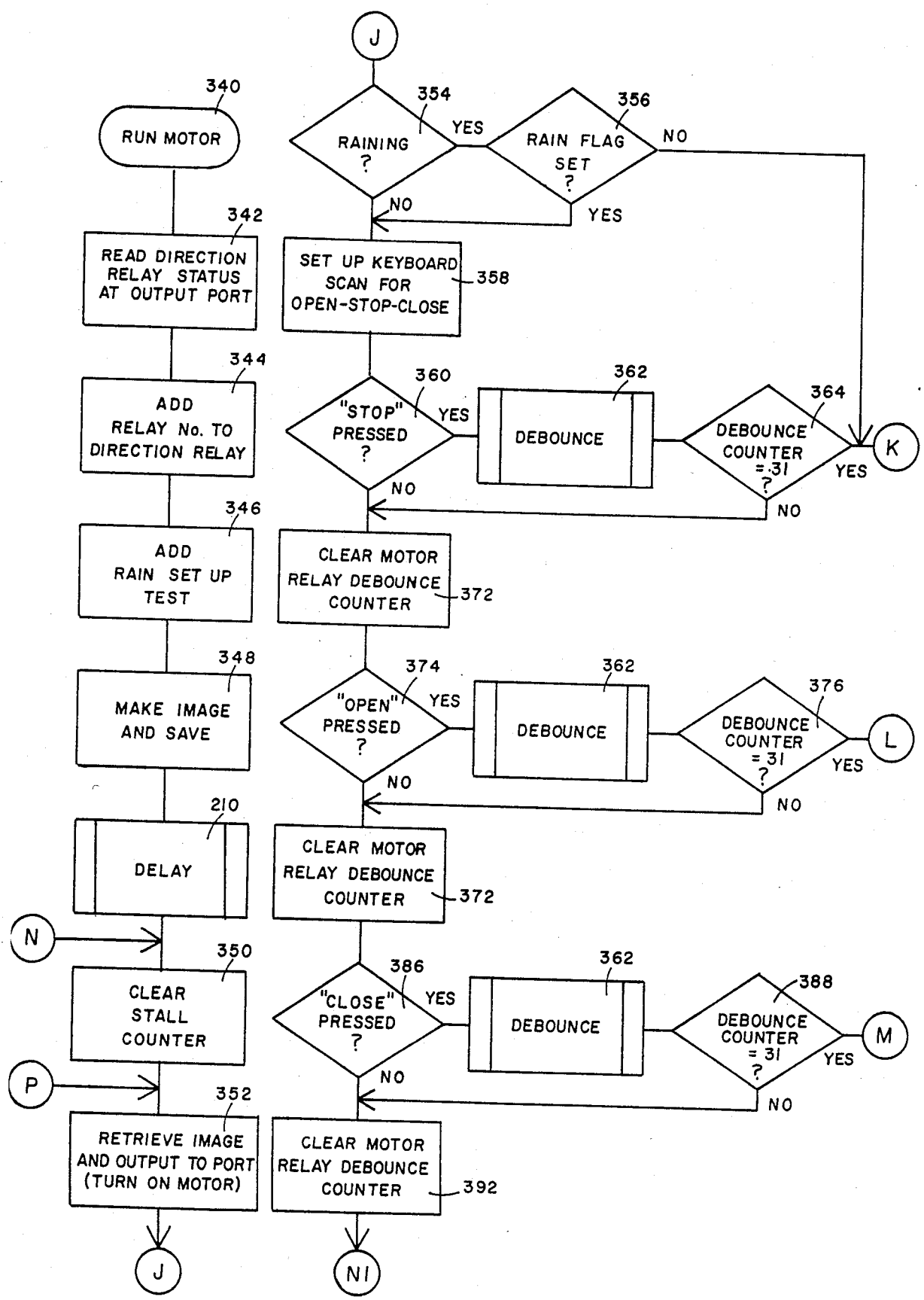
FIGS. 7A and 7B together constitute a flow chart of another subroutine called by the subroutines of FIGS. 4 and 5.
Figure 7B:
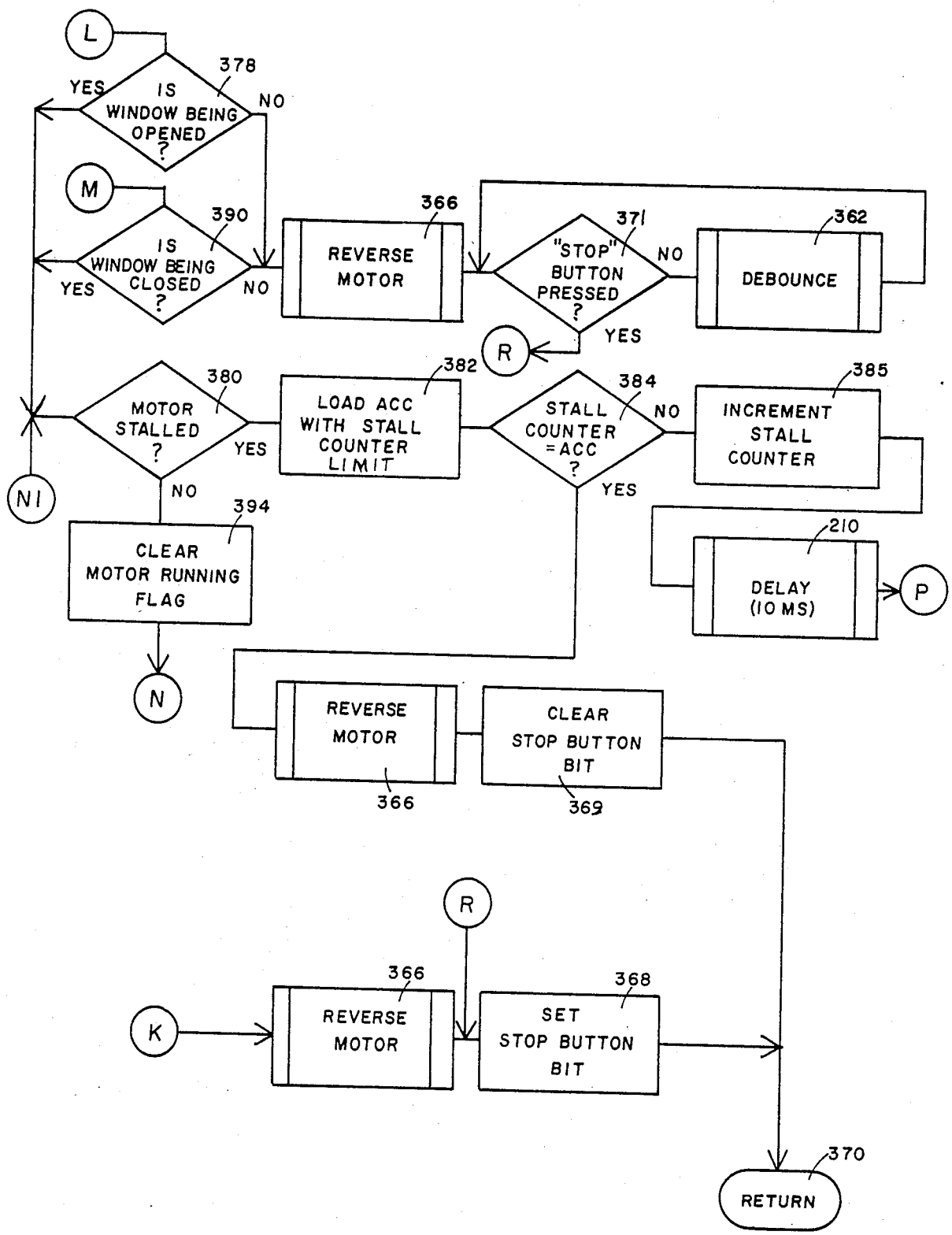

Illustrated in FIGS. 7A and 7B is the run motor subroutine 256 which is called both the awning and the casement window subroutines 230 and 232. The run motor subroutine begins at step 340 and proceeds first to step 342 in which the status of the direction relay is read by reading the bit at the output port associated with the appropriate output data bus lines 142. The program then proceeds to step 344 in which a logical addition is made of the relay number which is to be operated to the number containing the direction relay so that appropriate binary bits are placed both on the direction bit of the output byte and on the bit indicating the proper one of the four relays to be energized in that same output byte. The program then proceeds to step 346 which also adds to that bit an output bit which enables a rain test. At step 348 that combined byte containing the direction, relay, and rain test information is stored in temporary memory register inside of the microprocessor. A delay is then called by delay subroutine 210, after which the stall counter is cleared at program step number 350. The delay is programmed since the next step, at 352, is to retrieve the composite byte from storage and output that byte to the output of output data bus lines 142 to turn on the appropriate motor 16 by operating the respective relay 150. The motor 16 begins now to operate and to open or close the window, or window lock. The program thus proceeds to conditional branch 354 to determine whether there is rain or not. The program senses rain by actuating the appropriate one of the output data lines 50 so as to enable the comparator 96 to input the output of the rain sensor circuit 114 to the input data line 92 into the microprocessor 48. Thus, at this point, by checking the data line 92 it is possible to determine if rain is sensed by the rain sensor 164 placed in the window. If the conditional branch does detect rain at 354, the program proceeds to conditional branch 356 to determine if the rain flag has been set. If the rain flag has been set, the program branches back to step 358 to which the program would also branch if no rain is detected. Step 358 commences a scan of keyboard for open, stop or close commands, first beginning with a conditional branch at 360 to see if the stop button has been pressed. If the stop button has been pressed, there is a debounce subroutine called at 362 after which a conditional branch is made at 364 to determine if the debounce counter has reached 31. If the debounce counter has reached 31, then the program branches over to FIG. 7B and calls reverse motor subroutine 366 to reverse the operation of the motor for a short time period. After return from subroutine 366 the program then sets the stop button bit at step number 368 and returns to the calling routine at step number 370. If, at step 364 in FIG. 7A the debounce counter has not yet reached 31, the program branches to step number 372 in which the motor relay debounce counter is cleared. The program then proceeds to a conditional branch 374 to determine if the open button has been pressed. If the open button has been pressed, then the debounce subroutine 362 is called and again a conditional branch is made depending on whether or not the debounce counter has reached 31 upon return from the subroutine at step number 376. If the debounce counter has reached 31, the program branches to conditional branch 378 in FIG. 7B to determine if the window is being opened. This conditional statement is dependent upon the condition of the direction bit internally in the microprocessor. If the direction bit indicates that the window is being opened, the program proceeds to conditional branch 380 to determine if the motor is stalled.

The motor stall conditional test is implemented by gating "on" the comparator 84. This comparator is turned on by outputting a logical low, or binary 0, condition on the lowermost of the three output data lines 50 comprising one of the output registers from the microprocessor 48. The comparator 84 then responds to the output of the voltage comparator 74. The input to the voltage comparator 74 is connected to the node 70 which is the full rectified output of the rectifier 34, and which also is the power signal applied through the relay 154 to the motor 16 operating the window. If a motor is not connected to the node 70, the full wave rectified voltage measure at that node will actually pass below zero during each half cycle of the AC wave form. This below zero excursion of the waveform is caused by the inductance created by energization of any one of the coils of the relays 150 or 154 during a no motor situation. When a motor is operating, the armature winding of that motor passes through the permanent magnet field of the permanent magnet DC motor and generates a reverse current in the winding, referred to as back electromagnetic force or back EMF. The back EMF current flows back toward the bridge of rectifier diodes 34 and tends to hold the voltage at the node 70 well above zero. Thus there is no zero point of the wave form measured at the node 70, if the motor is running. If the motor stalls, again back EMF is not being generated, but the inductance of the motor windings superimposed over the full wave rectified output of the diode bridge 34 causes the zero crossings of the full wave rectified wave form to be actually below zero voltage. Since the comparator 74 compares the voltage at node 70 with ground it will tend to provide an output positive during most of the full wave rectified waveform but will create a negative output voltage should the voltage in node 70 go to or below ground. Should the output of comparator 74 be negative, it will discharge the capacitor 82 and provide a negative output to the comparator 84. The time constant of the resistor 78 and capacitor 82 combination is chosen so that during a motor stall condition the capacitor 82 remains discharged continuously. The microprocessor 48 in program step 380 reads the state of the bit at input data line 92 to determine motor operation condition. In terms of the program therefore, the microprocessor senses motor stall condition by outputting the logical zero on the output of the lowest of the output data lines 50 and by sensing the condition of the input data line 92 to determine motor operation or motor stall. Thus motor stall information is sensed by the microprocessor 48 even though no separate current sensing or limit switch elements are used in the system. Sensing of motor stall is accomplished by actually monitoring of only the voltage of the two wires provided to energize the motor 16.

If the motor is stalled, the program proceeds to step 382 where it loads an accumulator with a stall counter limit. The stall counter limit is an arbitrarily chosen number which determines how many cycles through motor stall testing have to be accomplished successively before the program concludes that an actual stall condition has occurred. This, of course, is to avoid accidentally assuming stall conditions during temporary transient conditions. The program then proceeds to step 384 to test to determine if the stall counter yet equals the limit stored in the accumulator. If the limit has not yet been reached the program proceeds to step 385 to increment the stall counter by one, then proceeds to call the delay subroutine 210 for 10 milliseconds, and then cycles back to program step 352 to cycle through the routine again. During an actual motor stall, which naturally occurs when the window is fully opened or closed, the program continually cycles through the routine from step 352 through the conditional branch 384 until the stall counter does reach the limit placed in the accumulator at which point the program branches and the reverse motor subroutine 366 is called to back the motor off from the stall point. This reverse motor subroutine 366 is performed to release the mechanical torque on the window operator 18. After return from the reverse motor subroutine 366, the internal stop button bit is cleared at step 369 and the program returns 370 from the subroutine. If, returning to conditional branch 378, the window is not being opened, the program then branches and immediately calls subroutine 366 to reverse the motor. Thus if the open button is pressed and the window is not being opened, the direction of window operation is reversed. The program then proceeds to conditional branch 371 to determine whether the stop button is pressed. If the stop button is not pressed then the program loops through a delay caused by the debounce subroutine 362 and continues to test for stop button operation. In other words, if the open command is depressed on the command module while the window is being closed, the program ends up in a loop between the conditional branch 371 and the delay debounce subroutine 362, until the user presses the stop button to acknowledge that an erroneous command condition has been entered. Once the stop button is depressed, the program branches to instruction 368 where the stop button bit is set and returns from the subroutine at 370. Similarly, if the open button hasn't been pressed, the program branches, back on FIG. 7A, to a second clear motor delay debounce counter step 372 and then proceeds through conditional branch 386, debounce subroutine call 362, and conditional branch 388 to determine if the closed button has been pressed sufficiently long to clear for debouncing. If the closed button is pressed, the program branches to conditional branch 390 to determine whether the window is being closed. Again, if the window is closed the program branches to the motor stall test 380 to sense motor stall condition. Again, also if the window is not being closed, in other words the closed button is depressed while the window is being opened, the program reverses the motor by subroutine 366 and then enters the loop consisting of conditional branches 371 and the debounce subroutine 362 until such time as the stop button is pressed. Assuming that the closed button is not pressed, again referring to FIG. 7A, the program then finally clears the motor relay debounce counter at step at 392 and branches directly to the motor stall test 380. If the motor is not stalled the program branches to step 394 and clears the motor running flag to indicate that there is no stall condition before looping back to the clear stall counter at 350. In other words, if the motor is operating at satisfactory condition the program clears the stall counter at 350, loops all the way between J and N1 on FIG. 7A, tests for motor stall at 380 in FIG. 7B, and then returns back to clear the stall counter at step 350. If a stall is detected at any point, the program branches out of this loop at motor stall test 380 and begins counting it loops through the increment stall counter step at 385. If the program loops through the step a sufficient number of times to bring the stall counter to the stall counter limit in the accumulator, the program then proceeds to reverse the motor through the use of subroutine 366 and then return from operations. In practical, mechanical terms, once the operation of a window has begun, the window continues operating continually in that same direction until a stall condition is sensed. The window thus closes until the window jam hits the frame or opens until the operator is fully extended at which point the motor stalls. The program then backs off on the motor slightly, through the reverse motor subroutine 366, to take the torque off of the window operator before ceasing motor operation.

Figure 8A:
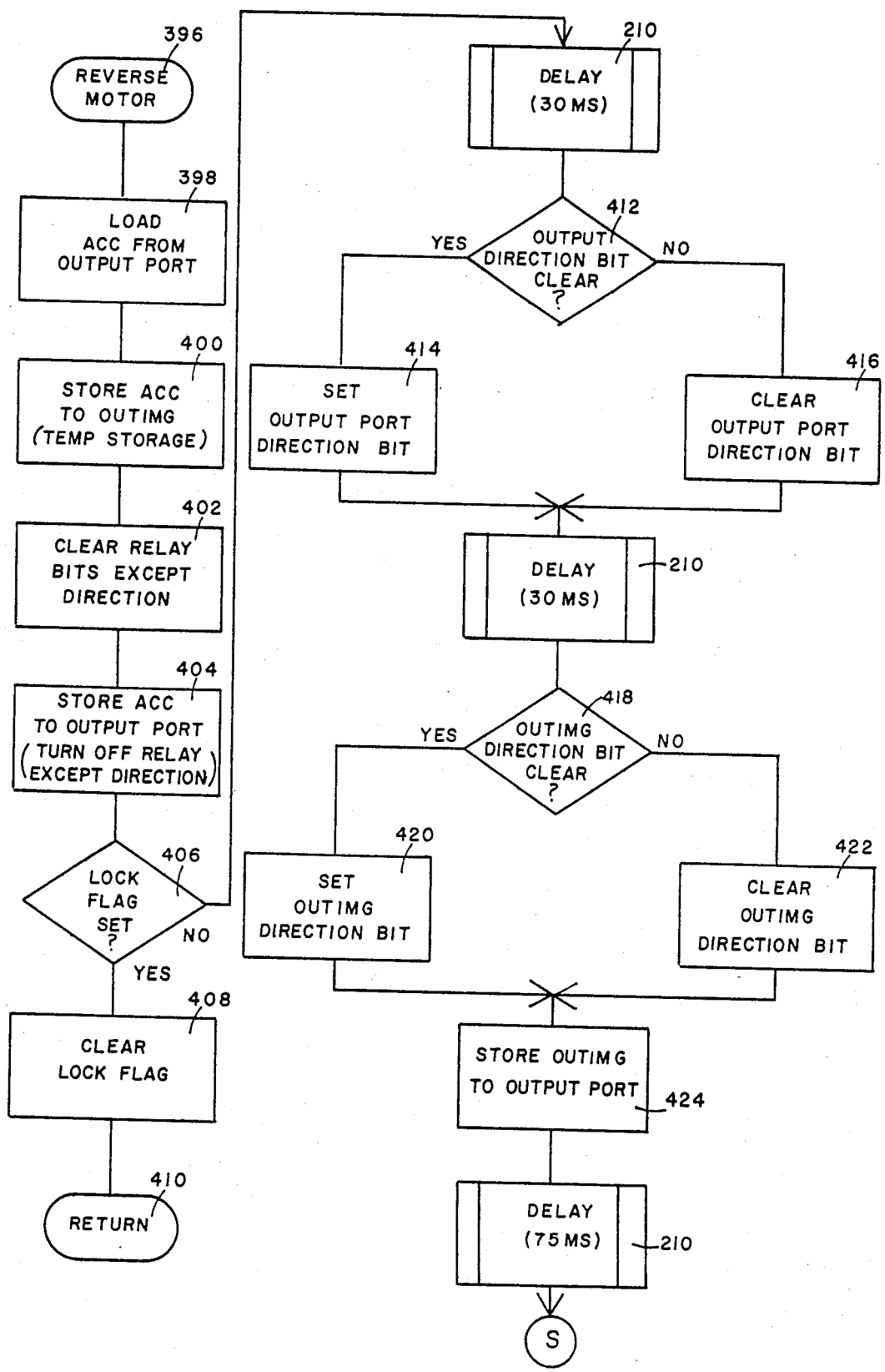
FIGS. 8A and 8B together illustrate another subroutine which is called by the routines of FIGS. 7A and 7B.
Figure 8B:
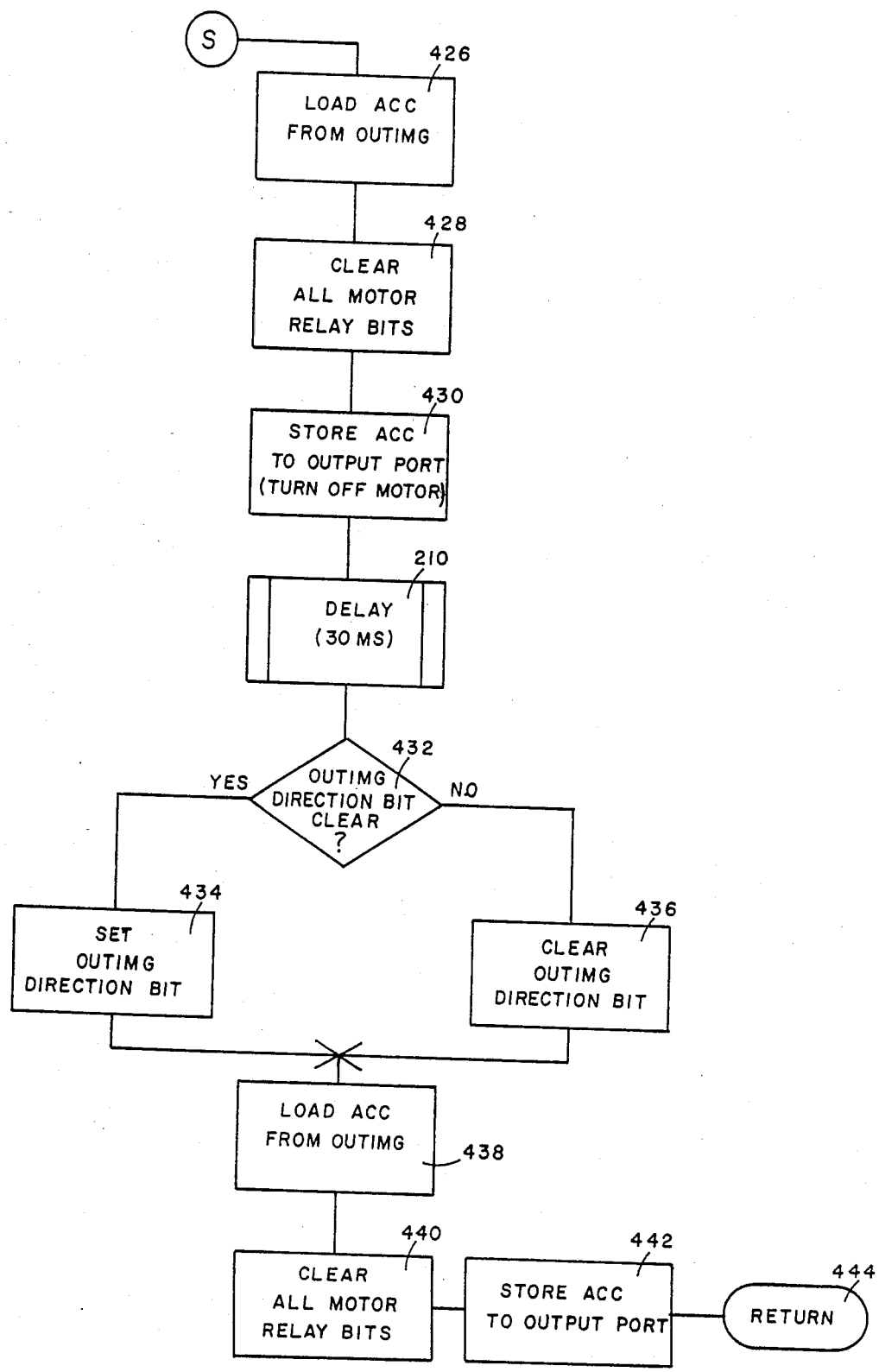

The procedural details of the reverse motor subroutine are shown in more detail in FIGS. 8A and 8B. The reverse motor subroutine begins at 396 and then proceeds to step 398 at which the accumulator is loaded with the byte presently on the output port. Then the byte in the accumulator, which is still the same bite on the output port, is loaded to a temporary storage location designated OUTIMG. Following that, all of the output relay bits except the bit for direction relay are cleared at step 402 in the accumulator and then at step 404 the accumulator is written to the output data bus port 142 to turn off all of the relays, but without yet changing the polarity of the direction relay 154. The program then does a conditional branch to determine if the lock flag is set at step 406. The lock flag is set by a step 272 in the casement window operating subroutine to indicate that when a casement window lock has been closed, no reverse motor operation is to occur so that the lock is not opened. Therefore if a lock flag set is sensed at 406, the program then proceeds to step 408 simply to clear the lock flag and then returns at 410. If a lock flag is not set, in other words if a window operation has occurred, the program then branches to a delay subroutine call at 210. Then the program determines at step 412 whether the output direction bit presently on the output data bus port is clear, i.e. is a logical zero or a one. If the bit is clear, indicating a zero, then the program branches to 414 to set that bit to a one. If the bit is already a one, then the program branches to step 416 to clear that bit. In other words the polarity of the bit is reversed. In either event, the program then commences another delay of 30 milliseconds by calling again the delay subroutine 210 to allow the changing state of the direction relay 154 time to settle. Then the program makes a similar conditional branch at 418 determining on the direction of the output bit sensed in program storage location OUTIMG and again reverses the polarity of the direction bit in that register by either proceeding through steps 420 or 422. In either event, the program then proceeds to step 424 where the entire bite stored in OUTIMG is transferred to the output data base port, i.e. lines 142, which thereby operates the motor 16 which had previously been operated with the polarity changed. A delay of 75 milliseconds is called by calling subroutine 210 to allow time for motor operation. Then the program proceeds to step 426 to load the accumulator from storage location OUTIMG. The program then proceeds to set 428 in which it clears all the motor relay bits in the accumulator and then at 430 transfers the contents of the accumulator to the output data bus port to turn off all of the motors once again. After another delay is called by subroutine 210 to allow the relay clatter to settle, and then the program proceeds through conditional branch 432 and steps 434 and 436 to again reverse the polarity of the direction bit in the storage location OUTIMG to restore it to its original polarity. The accumulator is then loaded from OUTIMG at step 438, again all of the motor relay bits are cleared in the accumulator at step 440, and the output of the accumulator is stored on the output port at 442, after which the subroutine returns at 444.

Figure 9:
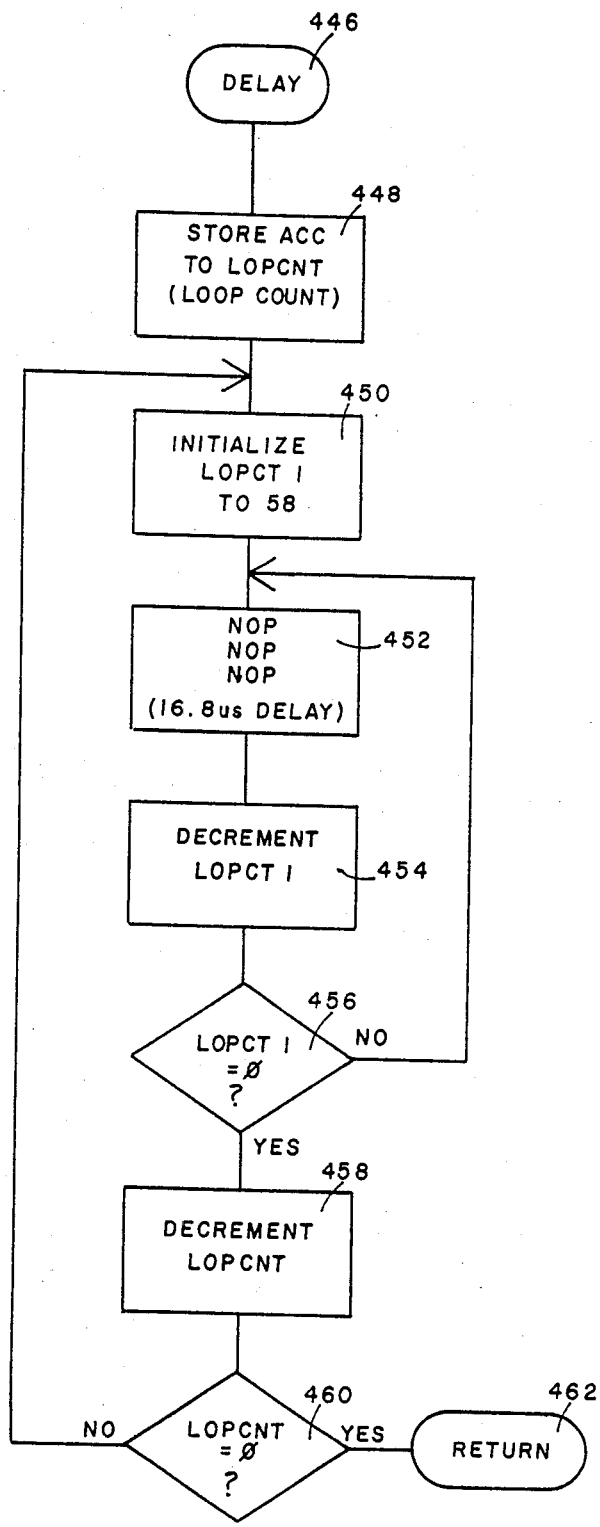
FIG. 9 illustrates the flow chart of a delay subroutine called by other parts of the program.

The delay subroutine illustrated in detail at FIG. 9 is a simply looping delay to delay for a time period determined by a variable passed from the calling program. Beginning at 446, the subroutine receives the past variable stored in the accumulator by storing it in storage location lopct then initializes another storage location lopct 1 to a preselected variable. The program then passes through a series of no operation steps at 452, decrements the lopct 1 register by 1 at 454, and then tests whether the count in that register has yet reached zero in conditional branch 456. If the count is not zero the program continues to loop. If the count has reached zero, the program then proceeds to decrement the master loop counter at storage location lopcnt at 458 and then tests at 460 if that count has just reached zero. When sufficient loops are done to reduce the value and lopcnt to zero, the program returns at 462.

Figure 10:
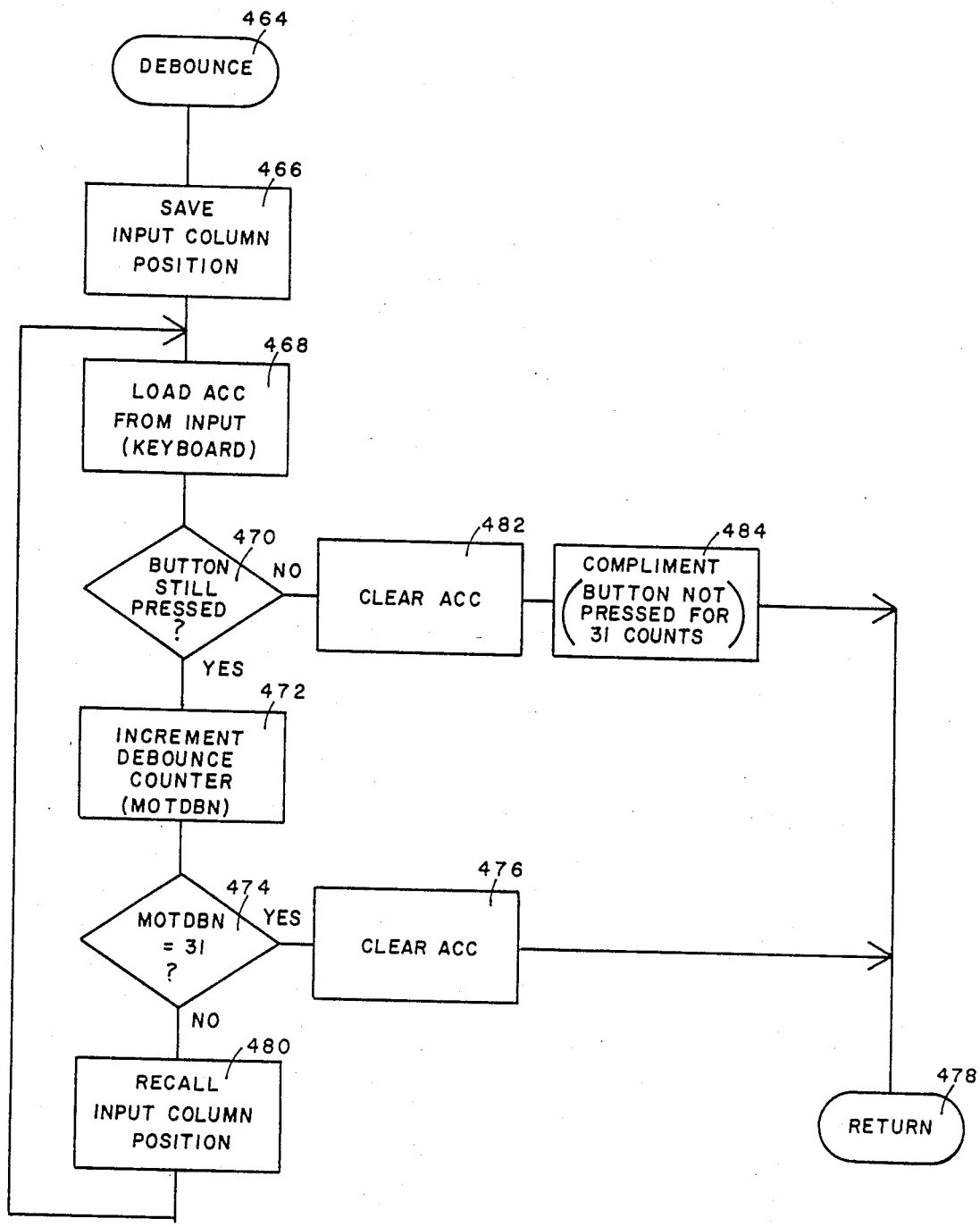
FIG. 10 illustrates a debounce subroutine called by various parts of the program.

Shown in FIG. 10 is a debounce subroutine intended to institute a delay to account for keyboard bounces during the keyboard scan operation. Subroutine begins at 464 and then at 466 stores the column position which has been selected. Then the program at 468 loads the accumulator from the input to determine which of the keys has been pressed at 468. The conditional branch is made at 470 to determine whether the button is still pressed again by sensing the appropriate input bit from the keyboard. If the button is still depressed the program proceeds at 472 to increment the debounce counter by one and then tests at 474 to see if the debounce counter has reached a preselected number, in this case 31. When the preselected number is reached the program branches at 476 to clear the accumulator and return at 478. If the debounce condition has not yet been reached, the program proceeds at 480 to recall the column position and then loops back to load the accumulator from the input of the keyboard at 468. If at any point during this loop the button is no longer pressed, the program branches out at 482, clears the accumulator and then returns.

In summary, the microprocessor thus scans the keyboard in the command module 12 and then takes action depending on the commands it senses in the buttons pressed on the command module. The microprocessor takes action by outputting a complete byte on its output data bus including output data lines 142 to appropriately direct the polarity relay 154 and energize the appropriate one of the motor relays 150 to select the direction and identity of the motor to be operated. Once motor operation is commenced, the microprocessor allows motor operation to continue until a motor stall condition is sensed. Thus a window or a window lock is operated continuously until the motor reaches an obstacle such as would be sensed when the window reaches the jamb or the full opening of the window operator is achieved. Motor stall is sensed by the commencement of zero voltage conditions between half wave cycles at the node 70 which is sensed by the comparator 74. When those cycles do reach zero the output of the comparator 74 goes low discharging the capacitor 82 and allowing the microprocessor to determine, when it polls the comparator 84 by selecting it through an appropriate ouput bit data line 50 to read at input data line 92 the state of the comparator 74. Thus the microprocessor continually operates the motor until the back EMF from the motor ceases thus indicating a motor stall condition. In this way successful and efficient operation of the motor can be achieved even though the motor is connected to the control circuit of FIGS. 2A and 2B by only a pair of wires which serve to energize the motor as well as giving control information to the microprocessor 48. In this way the wiring necessities of the system are minimized and no additional limit switches or current measuring devices are required to add to the cost or complexity of the system. Similarly, this system and approach for monitoring of motor control could be used for any other applications in which it is desired to drive motors until a limit is reached which could be sensed by determining motor stall. In addition, this approach could also be applicable in any other situation in which it is desired to sense motor stall merely by monitoring the back EMF from the motor between alternate half cycles of a fully rectified alternating current wave form.

It can now be appreciated from an understanding of the operation of the circuity of FIGS. 2A and 2B that the polarity of the output voltage applied on the motor driving lines 156 and 158 determines the direction by which the motor 16 rotates. The direction of rotation of the motor 16 determines whether the window is opened or closed. However, there is no standard in the industry for a window operator direction, and some windows are constructed such that clockwise rotation of a window operator 18 will open a window while some windows are constructed such that clockwise rotation of a window operator 18 will close the window. Therefore, the present system incorporates the adaptability to be modified to be operated with either kind of window. The feature of this system which allows adaptation to this variation is the provision for the reversability contained in the connector 164 as illustrated in FIG. 11.

To install the system so that appropriate window directional force is applied to the operator 18, the window is initially placed in an intermediate position between open and closed. The connector 164 for the motor 16 on that window is then inserted into the appropriate connector receptacle 171 in either one of its two configurations. The connector 164 has two configurations because it is doubly bilateral symmetrical in that it can be inserted in the receptacle in either of two oppositely oriented configurations, one being obtained by rotating the connector 180° from the other configuration. After the connector 164 is inserted into the connector receptacle 171 in either one of its two positions, with the appropriate configuration being selected arbitrarily, the command module 12 is used to select closing of the appropriate window. If the window proceeds to close the plug is inserted correctly and no further manipulation of the connector or the system is necessary. If the window proceeds to open when closure of the window has been selected, then the connector 164 needs to be removed, rotated 180°, and reinserted into the appropriate connector receptacle 171 in its opposite configuration. The window will now close properly if so directed. In this way the selection of orientation of motor rotation is selected by reversing the orientation of the connector 164 as appropriate. It can be readily seen that no matter which orientation of the connector 164 is selected, the conductors 166 of the connector 164 will mate with the conductors 170 of the connector receptacle 171 and the conductors 168 of the connector 164 will mate with the conductors 172 of the connector receptacle 171. Accordingly, the same two signal line conductors are associated with motor driving at all times and the same two signal line conductors are associated with the rain detector at all times. Thus the polarity of both devices is reversed when the connector 164 is reversed. Since the rain detector signal line 132, as indicated in FIG. 2A is energized by an alternating signal provided through transistor 120, which is connected before the rectifier to the AC power supply, the current to the rain detector is, in essence, alternating current. It is beneficial to apply alternating current to the rain detector in any event to avoid electrodeposition of one electrode of the rain detector on the other electrode over time. By providing an alternating current, the electrodeposition is reversed during each half cycle and no net transfer of metal between the electrodes of the rain detector 176 occurs over time. As can be seen in FIG. 11, the four conductors on the receptacle 171 and the connector 164 are arranged in a rectangular pattern. While this pattern is preferred, any other doubly bilateral symmetric pattern could also be used and other conductors could be added, if needed.

While this system is particularly adapted for use with a window operating system in which a rain sensor is located associated with the window and connected to the motor, it is also contemplated that other diverse two wire signal or sensing devices could be connected through the cable to the motor. Other such devices might include intrusion sensors, light sensors, a signaling device or other condition sensor. Whatever signal or sensor is connected through the motor cable will, of necessity, be energized by an alternating current or at least polarity independent signal so that the reversal of configurations of the connector is still possible.

In this fashion the correct orientation of operation of a window can be selected without the need for mechanical or electrical switches to be set by the user. Thus the system can be easily and quickly installed by a user in the correct polarity without the need for technical assistance by a skilled person in installing the system in a user's home.

It is to be understood that the present invention is not limited to the particular embodiment illustrated and described herein, but embraces all such modified forms thereof as come within the scope of the following claims.

We claim:

1. A remote window operating system comprising a direct current motor connected to operate the window, the motor opening and closing the window depending on the polarity of the voltage applied to the motor;
a diverse condition sensing device associated with the window to electrically sense a desired condition, the sensing device connected to the motor by two conductors;
a control circuit module for operating the motor by applying voltage of a selected polarity to the motor depending on user input and on the output of the sensing device;
a cable of four conductors connecting the motor to the control circuit module, two conductors each for the motor and the sensing device;
a four conductor connector receptacle on the control circuit module; and
a four conductor connector attached to the cable to connect the cable to the control circuit module by connection to the connector receptacle, the conductors on the receptacle and the connector arranged to be reversibly symmetrical so that the connector can be inserted in the receptacle in either of two reversed configurations, each configuration corresponding one direction of rotation of the motor for a given polarity of voltage so that the polarity of voltage causing window opening and closing can be selected by selection of one of the configurations of the connector.

2. A remote window operating system as claimed in claim 1 wherein the sensing device is a rain sensor located on the outside of the window to detect rainfall thereon.

3. A remote window operating system as claimed in claim 2 wherein the rain sensor is energized by an alternating current voltage so that polarity of signal to or from the rain sensor is immaterial.

4. A remote window operating system as claimed in claim 1 wherein the four conductors on each of the receptacle connector and the receptacle are arranged in a rectangular pattern.

5. A remote window operating system as claimed in claim 4 wherein there is a rain sensor and wherein the conductors and the pairs of conductors connected to the motor and to the rain sensor are each located diagonally opposite from the other conductor in each pair.

6. A remote window operating system as claimed in claim 1 wherein the motor is energized by a full rectified waveform by the control circuit module.

7. A remote window operating system as claimed in claim 6 wherein the control circuit module monitors motor operation by detecting the presence and absence of back electromagnetic force induced voltage on the conductors connected to the motor.

* * * * *